(12) United States Patent
Varnavski et al.

(10) Patent No.: US 12,313,549 B2
(45) Date of Patent: May 27, 2025

(54) TWO-PHOTON FLUORESCENCE MICROSCOPY AT EXTREMELY LOW EXCITATION INTENSITY

(71) Applicant: THE REGENTS OF THE UNIVERSITY OF MICHIGAN, Ann Arbor, MI (US)

(72) Inventors: Oleg Varnavski, Ann Arbor, MI (US); Theodore Goodson, III, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 209 days.

(21) Appl. No.: 17/802,607

(22) PCT Filed: Mar. 1, 2021

(86) PCT No.: PCT/US2021/020335
§ 371 (c)(1),
(2) Date: Aug. 26, 2022

(87) PCT Pub. No.: WO2021/174211
PCT Pub. Date: Sep. 2, 2021

(65) Prior Publication Data
US 2023/0147113 A1     May 11, 2023

Related U.S. Application Data

(60) Provisional application No. 62/982,463, filed on Feb. 27, 2020.

(51) Int. Cl.
*G01N 21/64*     (2006.01)
*G02B 21/00*     (2006.01)

(52) U.S. Cl.
CPC ..... *G01N 21/6458* (2013.01); *G01N 21/6408* (2013.01); *G01N 21/6428* (2013.01); *G02B 21/002* (2013.01); *G02B 21/0076* (2013.01)

(58) Field of Classification Search
CPC ........... G01N 21/6458; G01N 21/6408; G01N 21/6428; G02B 21/002; G02B 21/0076
See application file for complete search history.

(56) References Cited

U.S. PATENT DOCUMENTS 7,609,731 B2 * 10/2009 Dantus ............... G01N 21/4795
372/9
2002/0020819 A1 * 2/2002 Wolleschensky ..... G01J 3/2803
250/459.1

(Continued)

OTHER PUBLICATIONS

Varnavski, Oleg, Brian Pinsky, and Theodore Goodson III. "Entangled photon excited fluorescence in organic materials: an ultrafast coincidence detector." The journal of physical chemistry letters 8.2 (2017): 388-393. (Year: 2017).*

(Continued)

*Primary Examiner* — Dominic J Bologna
(74) *Attorney, Agent, or Firm* — MARSHALL, GERSTEIN & BORUN LLP

(57) ABSTRACT

The present disclosure pertains to two-photon microscopy, and specifically to methods and systems for optimizing the performance of entangled two-photon absorption (ETPA) microscopy. An ETPA microscope is described with time delay tunability to optimize the coincidence of entangled photons on a sample. The optimization allows for increased two-photon absorption by the sample, resulting in increased luminescence of the sample. The ETPA microscopy systems and methods described allow for nonlinear imaging using excitation energy intensities six orders of magnitude lower than comparable two-photon absorption microscopy techniques using classical light.

20 Claims, 16 Drawing Sheets

(56) References Cited

U.S. PATENT DOCUMENTS

| | | | |
|---|---|---|---|
| 2002/0180965 A1* | 12/2002 | Engelhardt | G02B 21/0048 356/318 |
| 2005/0213107 A1* | 9/2005 | Ichimura | B82Y 35/00 356/521 |
| 2012/0135458 A1* | 5/2012 | Corwin | G01N 1/312 435/40.5 |
| 2017/0191937 A1* | 7/2017 | Levenson | G01N 21/6445 |

OTHER PUBLICATIONS

International Application No. PCT/US21/20335, International Preliminary Report on Patentability, mailed Sep. 9, 2022.
International Application No. PCT/US21/20335, International Search Report and Written Opinion, mailed May 21, 2021.
Varnavski et al., Entangled Photon Excited Fluorescence in Organic Materials: An Ultrafast Coincidence Detector, J. Phys. Chem. Lett., 8(2):388-393 (2017).

* cited by examiner

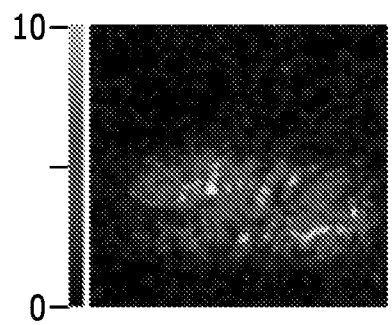
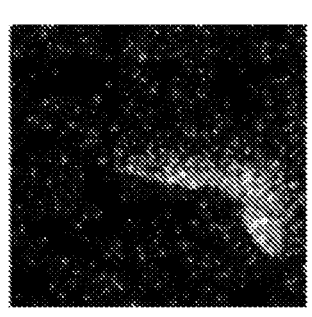
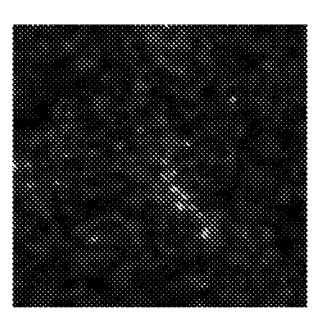
FIG. 11A   FIG. 11D   FIG. 11G
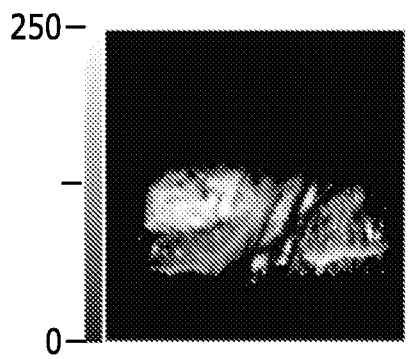
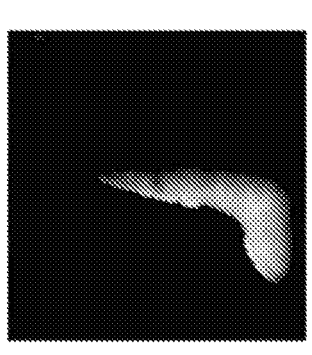
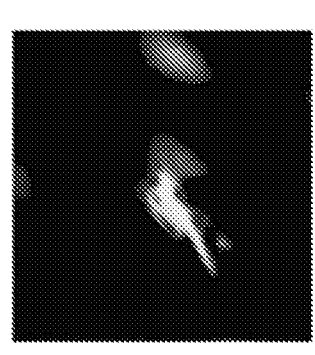
FIG. 11B   FIG. 11E   FIG. 11H
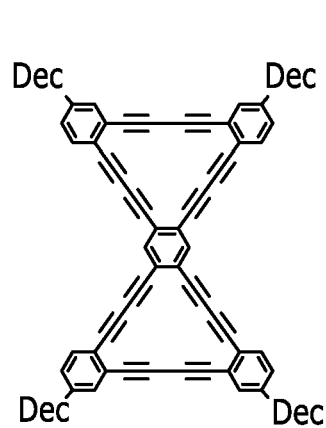
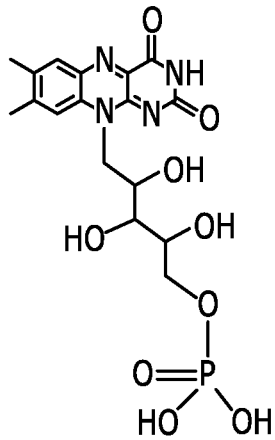
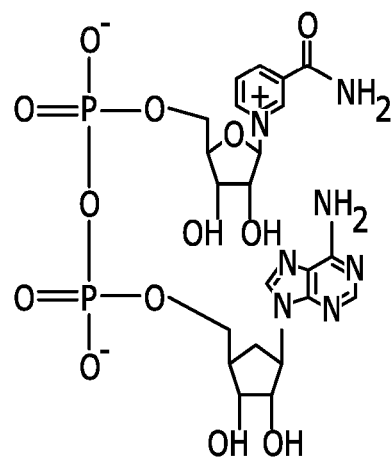
Bis[18]Annulene BT
Flavin Mononucleotide (FMN)
Nicotinamide Adenine Dinucleotide (NADH)
FIG. 11C   FIG. 11F   FIG. 11I

| | Experiment | Theory | | | |
|---|---|---|---|---|---|
| | $\sigma_e$ | | $\sigma_e$ | $g_e$ | |
| Molecule | ($10^{-19}$ cm²) | $f$ | ($10^{-19}$ cm²) | (μs) | $y_f/y_1$ |
| 6T (Planar) | 1.3 | ES2 | 7.1 | 988 | $6 \times 10^{-4}$ |
| 6T (Twisted) | | ES2 | 0.18 | 175 | $3 \times 10^{-3}$ |
| 18T | 7.1 | ES2 | 5.3 | 853 | $6 \times 10^{-4}$ |
| | | ES3 | 0.12 | 84 | $6 \times 10^{-3}$ |

TWO-PHOTON FLUORESCENCE MICROSCOPY AT EXTREMELY LOW EXCITATION INTENSITY

CROSS-REFERENCE TO RELATED APPLICATION

Priority is claimed to U.S. Provisional Patent Application No. 62/982,463, filed Feb. 27, 2020, the entire disclosure of which is incorporated herein by reference.

STATEMENT OF GOVERNMENT SUPPORT

This invention was made with government support under CHE1607949 awarded by the National Science Foundation. The government has certain rights in the invention.

FIELD OF THE INVENTION

The disclosure relates generally to methods and systems for performing microscopy, and specifically to two-photon microscopy systems.

BACKGROUND

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

Fluorescent microscopy is a microscopy imaging method that uses fluorescence to study the properties of organic or inorganic targets. Typically, a target for imaging is illuminated by light having a specific wavelength which is absorbed by fluorophores. The fluorophores then emit light having a wavelength longer than that of the illuminating light. Spectral filtering is then applied to separate the fluorescent light from the illumination light for imaging of the target.

Over time, fluorophores lose the ability to fluoresce as they are illuminated by a process called photobleaching. Photobleaching occurs over time as fluorescent molecules accumulate chemical damage from electrons that are excited during the fluorescent process. Further, living cells and target samples may be damaged by intense illumination light required for performing fluorescent, or fluorophores may generate reactive chemical species which leads to phototoxicity effects.

Two-photon excitation fluorescence (TPEF) microscopy is a technique that utilizes the nonlinear effect of two-photon absorption for performing fluorescent microscopy imaging. TPEF microscopy requires excitation of a fluorophore by two photons simultaneously. Typical TPEF utilizes near-infrared illumination light which reduces scattering in samples, compared to other fluorescent microscopy techniques. Also, due to multiphoton absorption, background signals are very weak increasing image resolution and contrast. Further, the use of two-photon absorption reduces the effects of photobleaching and allows for deeper penetration depths.

Two-photon absorption must occur with two-photons simultaneously, and therefore, it is much weaker and less likely to occur as compared to single-photon absorption. To increase the rates of two-photon absorption high intensities of illumination light are required which can destroy tissues, cells, other living targets, or disrupt molecular and electrical bonds. Moreover, the signal-to-noise ratio (SNR) for a given light intensity is limited by the standard quantum limit, which is often important for the measurements where the probe light intensity is reduced to avoid damaging the sample. Further, the standard quantum limit also limits the spatial resolution of TPEF microscopy images.

Thus, there is a need for a method for performing high resolution fluorescent imaging of samples that utilizes low intensity illumination light to avoid damaging the sample. Additionally, there is need for microscopy methods that are not limited by the standard quantum limit, for high spatial resolution of targets at the sub-micron scale.

SUMMARY OF THE INVENTION

In example embodiments, ETPA microscopy system and methods include signal-idler delay scanning enabling the selectivity of excitations of particular states/species in a sample, and further including performing local specimen spectroscopy. Other example embodiments include methods that include spontaneous parametric down conversion (SPDC)—microscope coupling enhancements utilizing entangled photon beam characterization and optimization of the entangled photon scanner throughput at the microscope objective lens. Yet other example embodiments include a light-tight microscope enclosure allowing quick sample change and dark count rate below 1 photon/pixel. In other example embodiments, methods and systems include signal collecting and processing procedures that utilize a time-gated photon counter synchronized with the microscope scanner to provide a high signal-to noise ratio.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

FIG. 11A is an ETPA microscopy image of a biz[18] annulene (BT) drop cast film, in accordance with an example.

FIG. 11B is a classical TPA microscopy image of a BT drop cast film, in accordance with an example.

FIG. 11C is a diagram of the molecular structure of BT.

FIG. 11D is an ETPA microscopy image of a flavin mononucleotide (FMN) drop cast film, in accordance with an example.

FIG. 11E is an classical TPA microscopy image of a FMN cast film, in accordance with an example.

FIG. 11F is a diagram of the molecular structure of FMN.

FIG. 11G is an ETPA microscopy image of an anicotinamide adenine dinucleotide (NADH) drop cast film, in accordance with an example.

FIG. 11H is an classical TPA microscopy image of a NADH drop cast film, in accordance with an example.

FIG. 11I is a diagram of the molecular structure of NADH.

DETAILED DESCRIPTION

Figure 1:
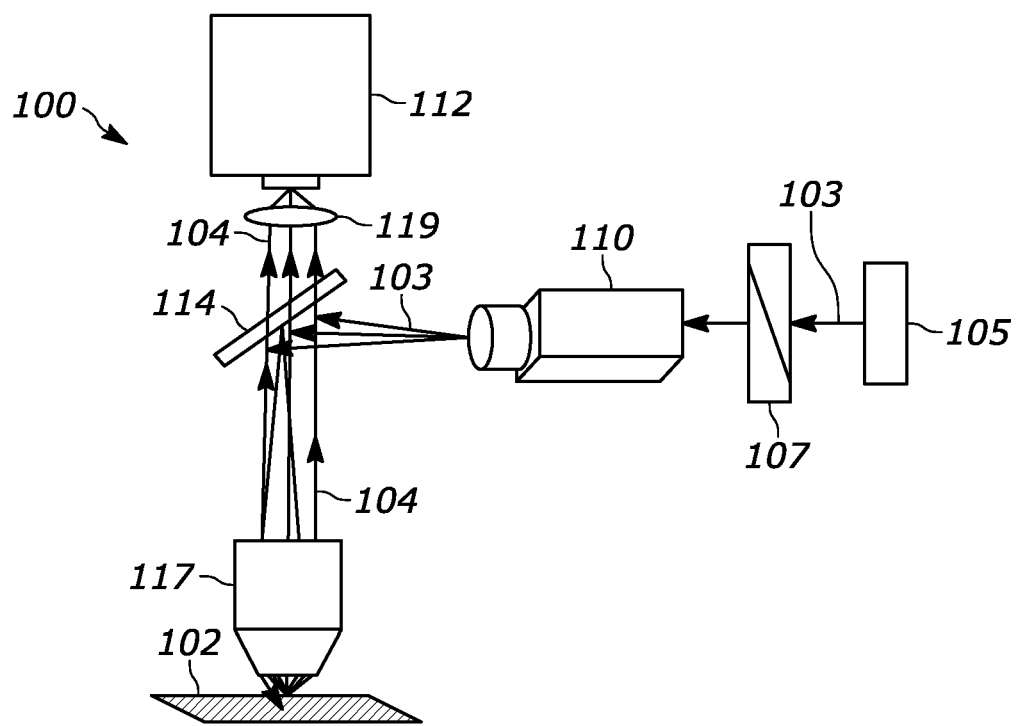
FIG. 1 is a block diagram of an example microscopy system for performing entangled two-photon absorption (ETPA) microscopy, in accordance with an example.

Quantum entanglement has been shown to imply correlations stronger than those allowed by classical models. The possibility of performing tasks which are classically impossible has made quantum entanglement a powerful resource for the development of novel methods and applications in various fields of research such as quantum computing, quantum cryptography, and quantum metrology. Applications of non-classical light to molecular spectroscopy have recently received increasing attention offering novel powerful spectroscopic of non-classical light to molecular spectroscopy have recently received increasing attention offering novel powerful spectroscopic tools. There is a great need for the development of next generation spectroscopic instrumentation and technologies utilizing entangled quantum light. Among the many applications of non-classical states of light, nonlinear microscopy has the potential to make an impact in broad areas of science from physics to biology.

Entangled two-photon microscopy offers nonlinear imaging capabilities at a low excitation intensity which is six orders of magnitude lower than the excitation level required for classical two-photon image. The disclosed methods and systems enable capturing of microscopic images created by fluorescence selectively excited by the process of entangled two-photon absorption. The obtained images depend on a femtosecond scale delay between components of the entangled photon pair. The delay dependence is a result of specific quantum interference effects associated with the entanglement which is not observable using classical excitation light. In combination with novel spectroscopic capabilities provided by a non-classical light excitation, the disclosed imaging systems and methods are importance for sensing and biological applications, among others.

Utilizing non-classical states of light possessing highly correlated photons enables low-intensity imaging and microscopy, and more precise measurements, at intensities not achievable with classical resources. The described systems and methods are not limited by the standard quantum limit (SQL) which allows for increased spatial resolution as compared to other two-photon imaging techniques. The two-photon fluorescent microscopy methods and systems described herein utilize the entangled two-photon absorption (ETPA) effect to induce the fluorescence of the sample in the microscope. Due to energy-time entanglement the absorption of entangled photon pairs can be very efficient at low power in comparison with classical random two-photon absorption enabling extremely low intensity microscopic measurements. Qualitatively, both components of the entangled photon pair arrive at the same location almost simultaneously, thereby providing an enhanced two-photon absorption efficiency and subsequent and fluorescence efficiency. The two-photon absorption enhancement allows for the excitation light intensity much lower than that required for classical light TPA for a same fluorescence intensity. To further reduce the excitation intensity, the described systems and methods may provide enhanced spatial resolution from the entanglement of signal and idler by the same mechanism as in quantum lithography with a two-beam excitation beam geometry.

ETPA efficiency exhibits a non-monotonic dependence on a time delay between entangled pair components. The non-monotonic behavior is a unique property of the non-classical light of ETPA. The period profile of the non-monotonic dependence on the inter-component delay contains the spectroscopic signature of a target material and can be used as a powerful spectroscopic tool to determine components of a material. Therefore, the quantum interference of ETPA can be used to characterize a material system with which the entangled photon pair is interacting. The described methods and systems utilize the non-monotonic ETPA efficiency by providing a tunable signal-idler time delay to perform ETPA microscopy and spectroscopy.

FIG. 1 is a diagram of an embodiment of a microscopy system 100 for perform ETPA microscopy. The system 100 includes a sample 102, an entangled photon source 105, a delay line 107, a scanner 110, and a detector 112. The entangled photon source 102 generates an entangled photon pair 103 that propagates along an axis of propagation. The entangled photon pair 103 includes an idler photon and a signal photon. The delay line 107 is disposed along the axis of propagation and is configured to provide a temporal delay between the idler and the signal photons of the photon pair 103. Thus the delay line is an example of a temporal delay line that is formed of one or more of a birefringent delay line, a freespace delay line, a fiber delay line, a dispersive delay line, or another type of optical delay line.

The scanner 110 changes the trajectory of the photon pair 103 to provide the photon pair 103 to different transverse locations of the sample 103 for imaging of the sample 103. A dichroic beam splitter 114 directs the photon pair 103 toward an objective lens 117, and the objective lens 117 focuses the photon pair 103 onto the sample 103. The sample 103 absorbs the photon pair 103 and emits fluorescence 104. The dichroic beam splitter 114 transmits the fluorescence 104 and a lens 119 focuses the fluorescence 104 onto the detector 112. The detector 112 detects the fluorescence 104 and generates an electrical signal indicative of the detected fluorescence.

Figure 2:
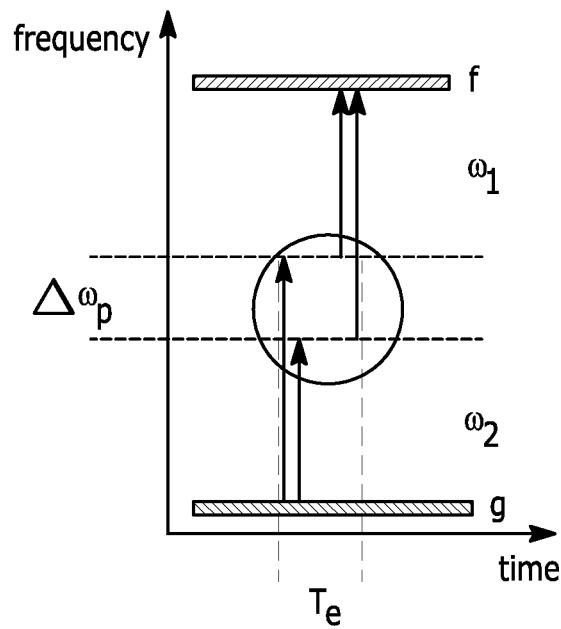
FIG. 2 is a diagram of a frequency time plot illustrating the entanglement time of entangled photon pairs generated by spontaneous parametric down conversion (SPDC), in accordance with an example.

In an embodiments, the entangled photon source 105 generates the entangled photon pair 103 through spontaneous parametric down conversion (SPDC). FIG. 2 is a diagram of a frequency time plot illustrating the entanglement time of entangled photon pairs generated by SPDC. SPDC is a process by which a pump radiation having energy, $\hbar\omega_p$, with $\omega_p$ being a frequency of the radiation, excites an electron to an excited state and two photons having energies $\hbar\omega_1$ and $\hbar\omega_2$ are generated during de-excitation of the electron. Due to conservation of energy, $\omega_p=\omega_1+\omega_2$. Due to the pump radiation having a bandwidth, $\Delta\omega_p$, each of the energies $\omega_1$ and $\omega_2$ has an uncertainty that is dependent on the pump bandwidth. The circle in the middle of FIG. 2 illustrates the uncertainty due to the pump bandwidth, and how it may affect the uncertainties of the generated photon pair 103. Further, due to the time-energy uncertainty principle, the entanglement time can be determined to be $T_e$, as illustrated in FIG. 2. Therefore, SPDC generates a photon pair having an entanglement time $T_e$ which can be further used to perform the ETPA microscopy as described herein.

An ETPA microscopy system was constructed according to the illustrated system 100 of FIG. 1. The entangled photon source 105 generated the entangled photon pair 103 through SPDC in a BBO crystal. The SPDC in the BBO crystal was accomplished via type-II phase matching in the non-linear crystal. A source pump for the SPDC was provided by a femtosecond pump laser source. A Ti-sapphire laser (Mai Tai, Spectra Physics Inc.) supplied master pump radiation at a central wavelength of 800 nm with approximately a 7 nm bandwidth. The master pump radiation was converted to its second harmonic and the output pulse with the central wavelength 400 nm was directed towards the downconversion nonlinear crystal (i.e., the BBO crystal). A combination of a prism and an interference filter was used to separate the second harmonic from the fundamental. The BBO crystal was 1 mm thick and a two-photon quantum state was generated in the collinear configuration type-II SPDC in the BBO crystal. A dichroic mirror (DM) and an interference long pass filter (IF) with the cut on-wave wavelength at 750 nm (FEL0750, Thorlabs Inc.) were used to remove remaining 400 nm light. Insertion of a second filter FEL050 did not affect the count rates indicating no leak of the residual blue light. In some measurements and experiments an interference bandpass filter (IF) with the bandwidth 12 nm (FF01-800/12-25, Semrock Inc.) centered at 800 nm was used to select the near-degenerate biphotons. Each component of the entangled photon pair 103 (i.e., the signal photon and the idler photon) had a wavelength in the near-infrared range between 720 nm and 1500 nm. In examples, the entangled photon pair 103 may have a wavelength between 400 nm and 800 nm, between 600 nm and 1200 nm, between 1 micron and 5 microns, or another wavelength capable of being generated by SPDC. To evaluate the performance of the entangled photon source 105, downconverted photons (i.e., entangled photon pairs) were detected by silicon avalanche photodiode (APD) single photon counting modules (Perkin-Elmer SPCM-AQR-13) or by a CCD camera (ST-402, SBIG Astronomical Instruments).

The entangled photon source 105 was able to produce $1.2*10^7$ photons/s output flux (singles). Diagnostics of the SPDC output utilizing a polarizing beamsplitter and two APD detectors showed the signal-idler coincidence rate up to $1.5*10^6$ coincidence counts/s. Within type-II SPDC phase matching conditions, the signal (o-ray) and idler (e-ray) photons are generated at orthogonal polarizations. Polarization visibility measurements were been performed with a 50/50 non-polarizing beamsplitter and two polarizers placed in individual APD optical paths for both the signal and idler photons. The coincidence count rate as a function of the polarizer angle at one APD was collected. The measurement of the coincidence count rate showed a periodic modulation of the coincidence rate with a visibility of approximately 88.5%, while singles rates remained relatively constant. The visibility obtained is evidence of non-classical quantum interference given by polarization entangled states produced by SPDC.

The scanner 110 was a Galvo-Galvo Scan Head (4 mm input aperture diameter, LSK-GG, Thorlabs Inc.), and two scan lenses of 5 cm and 20 cm focal lengths (SL50-CLS2 and TL200-CLS2, respectively, Thorlabs Inc.) were used to scan an excitation beam angle of the entangled photon pair 103. The objective 117 was a 0.4 microscope objective lens that received the photon pair 103, and the scanner 110 and lenses were able to scan the beam angle of the photon pair at the overfilled back aperture of the 0.4 NA microscope objective lens.

To perform imaging of the sample 102, the focus of the objective 117 was raster scanned by galvo mirrors of the scanner 110 across the sample 102. The excitation light beam (i.e., beam having the entangled photon pair 103) was to the objective by the dichroic beam splitter 114 (DMSP750B, Thorlabs Inc.) having a high reflectance at 800 nm. The fluorescence 104 from the sample 102 was visible light that was epi-collected by the objective 117 and passed through the dichroic beamsplitter 114 that was transparent to the visible fluorescence 104. The fluorescence 104 propagated through two filters (FF02-409/LP, Semrock Inc. and 750 nm, OD 4 Shortpass Filter, Edmund Optics) that filtered out scattered light at 400 nm and 800 nm. The detector 112 was a cooled photo-multiplier tube (PMT) (R7518P, Hamamatsu Photonics). The fluorescence 104 was detected by the detector 112 and the detector provided a signal indicative of the detected fluorescence to a data acquisition device. The data acquisition and scanner control were implemented using a DAQ card (NI PXIe6341, National Instruments Corp.) and Scanimage (Vidrio Technologies Inc.) software.

Figure 3B:
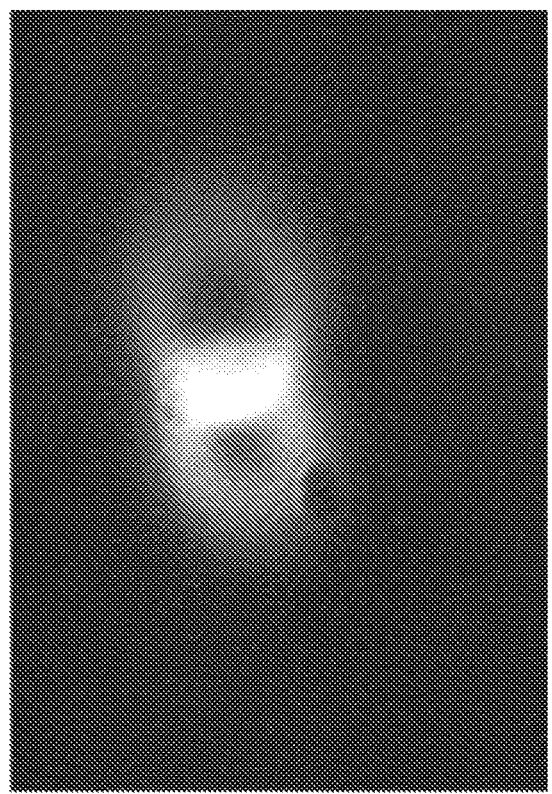
FIG. 3B is an image captured by a CCD camera at the output port of an entangled photon source with a maximally overlapped collimated SPDC beam, in accordance with an example.
Figure 3A:
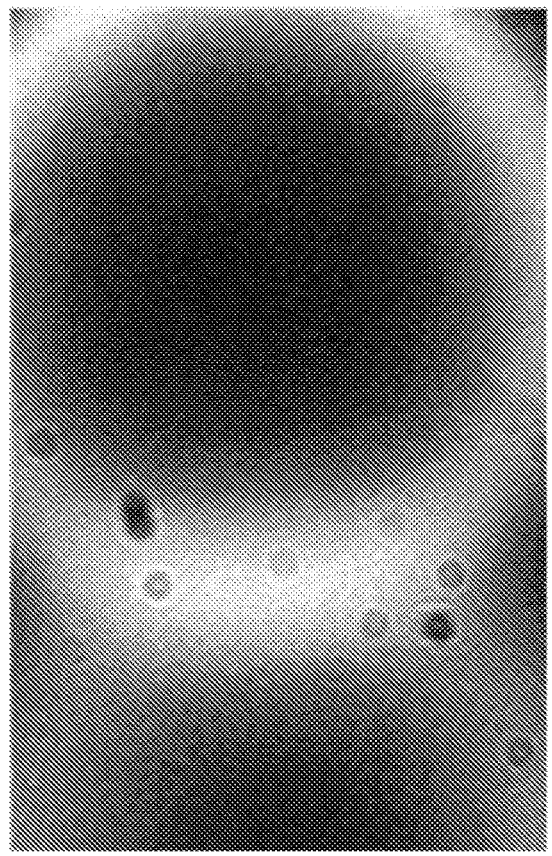
FIG. 3A is an image of the output transverse beam profile characteristic for a type-II SPDC configuration as captured by a charged coupled device (CCD) camera installed at an output port of an entangled photon source, in accordance with an example.

The alignment of the output beam of entangled photon pairs 103 from the entangled photon source 105 was optimized to provide the photon pairs 103 to the system 100. A focusing lens for the SPDC pump was chosen to obtain the highest output of the specific type of SPDC generated photon pairs. The focusing lens had the focal length of 10 cm, and the position of a collimating lens with a focal length of the collimating lens was tuned to match the size of an intersection area of ordinary and extraordinary cones of the SPDC with the size of the input aperture of the microscope scanner which was 4 mm. The BBO crystal was aligned to produce collinear and degenerated SPDC. FIG. 3A is an image of the output transverse beam profile characteristic for the type-II SPDC configuration as captured by a CCD camera installed at an output port of the entangled photon source 105.

Figure 4:
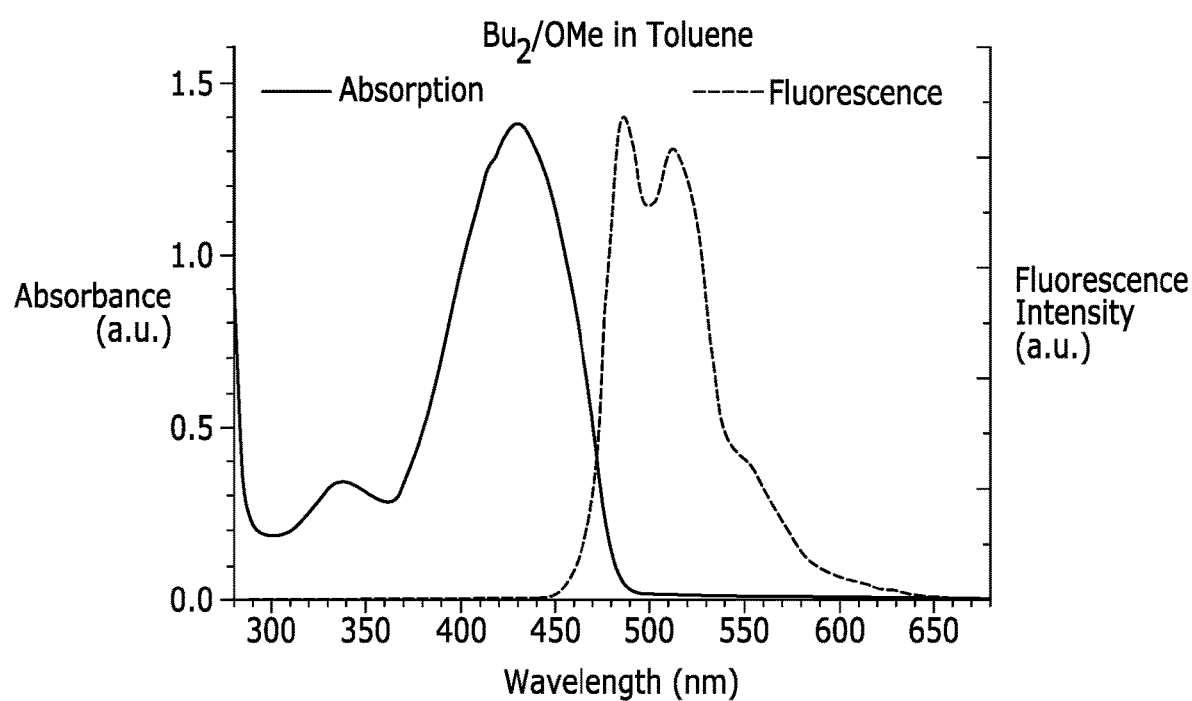
FIG. 4 is a plot showing absorbance and fluorescent intensity as a function of wavelength of bis-(styryl)benzene derivative $Bu_2$/OMe as obtained by an ETPA microscopy system, in accordance with an example.

The angle of the BBO crystal was tuned to provide a maximum cone intersection in collinear geometry. FIG. 3B is an image captured by a CCD camera at the output port of the entangled photon source 105 with a maximally overlapped collimated SPDC beam (i.e., photon pair beam). The size and position of the cones intersect area was matched with the size and position of an input aperture of the system 100 by adjusting the collimating lens. Using the two-photon excitation of the microscopy system 100 the optical elements (e.g., scanner 110, objective 117, beam splitter 114, other lenses, filters, etc.) were adjusted and test images of thin films of substances were obtained. FIG. 4 is a plot showing the absorbance and fluorescent spectra of bis-(styryl)benzene derivative $Bu_2$/OMe as obtained by the constructed ETPA microscopy system 100. $Bu_2$/OMe is a substance that exhibits strong two-photon absorption fluorescence, which is why it was chosen as a test target as the sample 102.

The constructed microscopy system 100 was capable of imaging at very low fluorescence signals below 1 photon/s.

Figure 5:
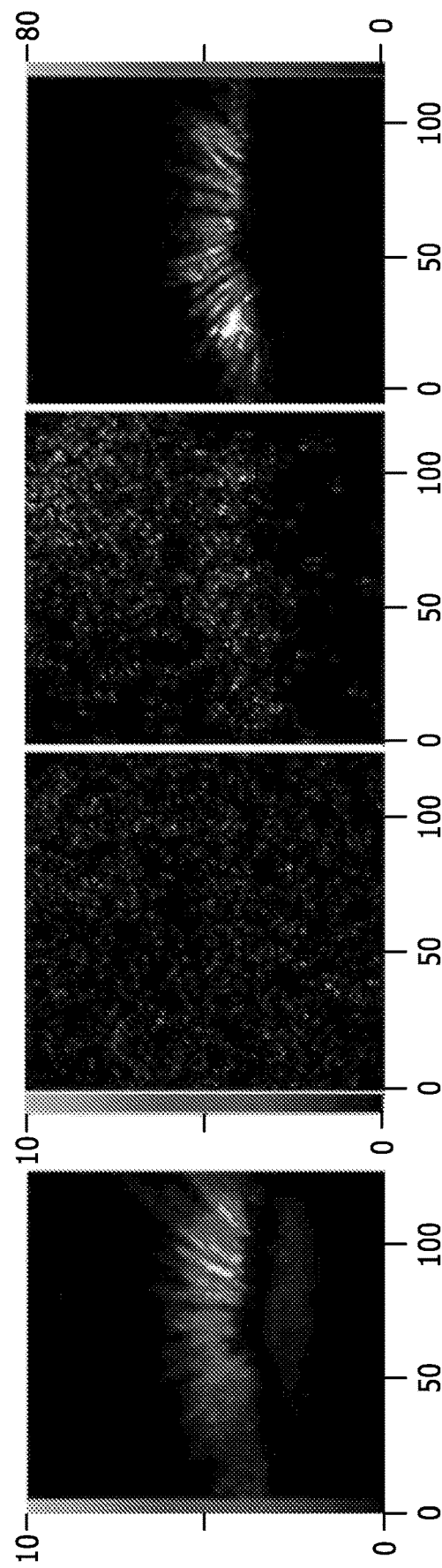
FIG. 5A is an image of $Bu_2$/OMe in a drop cast film generated by the ETPA microscopy system of FIG. 1 with an excitation flux of $10^7$ photons/s, in accordance with an example.
FIG. 5B is an image of Bu$_2$/OMe in a drop cast film captured by a classical light two-photon absorption (TPA) microscopy system with an excitation flux of 0.96×10$^{12}$ photons/s, in accordance with an example.
FIG. 5C is an image of Bu$_2$/OMe in a drop cast film captured by a classical light TPA microscopy system with an excitation flux of 0.96×10$^{13}$ photons/s, in accordance with an example.
FIG. 5D is an image of Bu$_2$/OMe in a drop cast film captured by a classical light TPA microscopy system with an excitation flux of 5×10$^{13}$ photons/s, in accordance with an example.

FIG. 5A is an image of $Bu_2$/OMe in a drop cast film generated by the ETPA microscopy system 100 with an excitation flux of $10^7$ photons/s, and FIGS. 5B-5D are an image of the same $Bu_2$/OMe in the drop cast film captured by a classical light TPA microscopy system with excitation fluxes of $0.96 \times 10^{12}$, $0.96 \times 10^{13}$, $5 \times 10^{13}$ photons/s respectively. The photon count rate of the provided excitation photons (i.e., for classical TPA microscopy and for the ETPA microscopy) were measured and maximized by adjusting the beam direction of the entangled photon source 105, the scanner optics (i.e., scanner 220 and associated lenses/mirrors), and tube lenses. The photon count rate at the position of the objective 117 was compared with the photon count rate at an entrance to the scanner 110. The highest photon count rate at the objective 117 was approximately $6 \times 10^6$ photons/s, which corresponds to an SPDC output beam coupling efficiency (i.e., the ratio of the excitation flux at the sample 102 to the flux at the entrance to the scanner 110) 105 of 0.46.

The image of FIG. 5A using the entangled photon excitation flux on the order of $10^7$ photons/s is compared with the image of FIG. 5B, obtained with the classical two-photon excitation with intensity on the order of $10^{12}$ photons/s. The image of FIG. 5B demonstrated a fluorescence image intensity on the dark noise level despite an excitation flux increase of five orders of magnitude greater than the ETPA image of FIG. 5A. The reduced image visibility, despite the increase in excitation flux, demonstrates a substantial enhancement of the two-photon absorption efficiency when using highly correlated entangled photon pairs. The images of FIGS. 5C and 5D illustrate that the entangled photon flux image of FIG. 5A generated an image of the same intensity, in photons/pixel, as that obtained with classical light having an average photon flux on the order of $1.2 \times 10^{13}$ photons/s. The enhancement allows for using a sample probing light flux in an ETPA microscope six orders of magnitude (i.e., $10^6$) lower than that used with classical light two-photon excitation. The reduction of the probing light intensity is an advantage of the ETPA microscope for various applications, and may be especially useful for imaging in biological applications.

A precise polarization-dependent optical delay line based on birefringent material wedges was implemented as the delay line 107 of FIG. 1. The polarization-dependent optical delay line enabled control of the relative delay between orthogonally polarized biphoton components with the accuracy of 0.02 fs per step of a motor of the delay line 107. In embodiments, the delay line 107 may be capable of providing a temporal delay resolution of 0.2 fs, 0.5 fs, 1 fs, 2 fs, 5 fs, a resolution of less than 1 fs, a resolution of less than 1 ps, or another temporal resolution as required. The temporal delay line may be capable of providing delays of 0 seconds, 1 picoseconds, 5 picoseconds, between 0 and 5 picoseconds, between 0 and 10 picoseconds, between 5 and 50 picoseconds, between 0 and 1 nanoseconds, or longer than a nanosecond. The delay line was made from a pair of 25 mm×20 mm×15 mm crystalline quarts wedges, as further described in reference to FIG. 10. The delay line 107 was capable of producing a variable temporal delay between orthogonally polarized biphoton components with an accuracy of 0.02 fs per incremental step of the motorized delay line.

Figure 6:
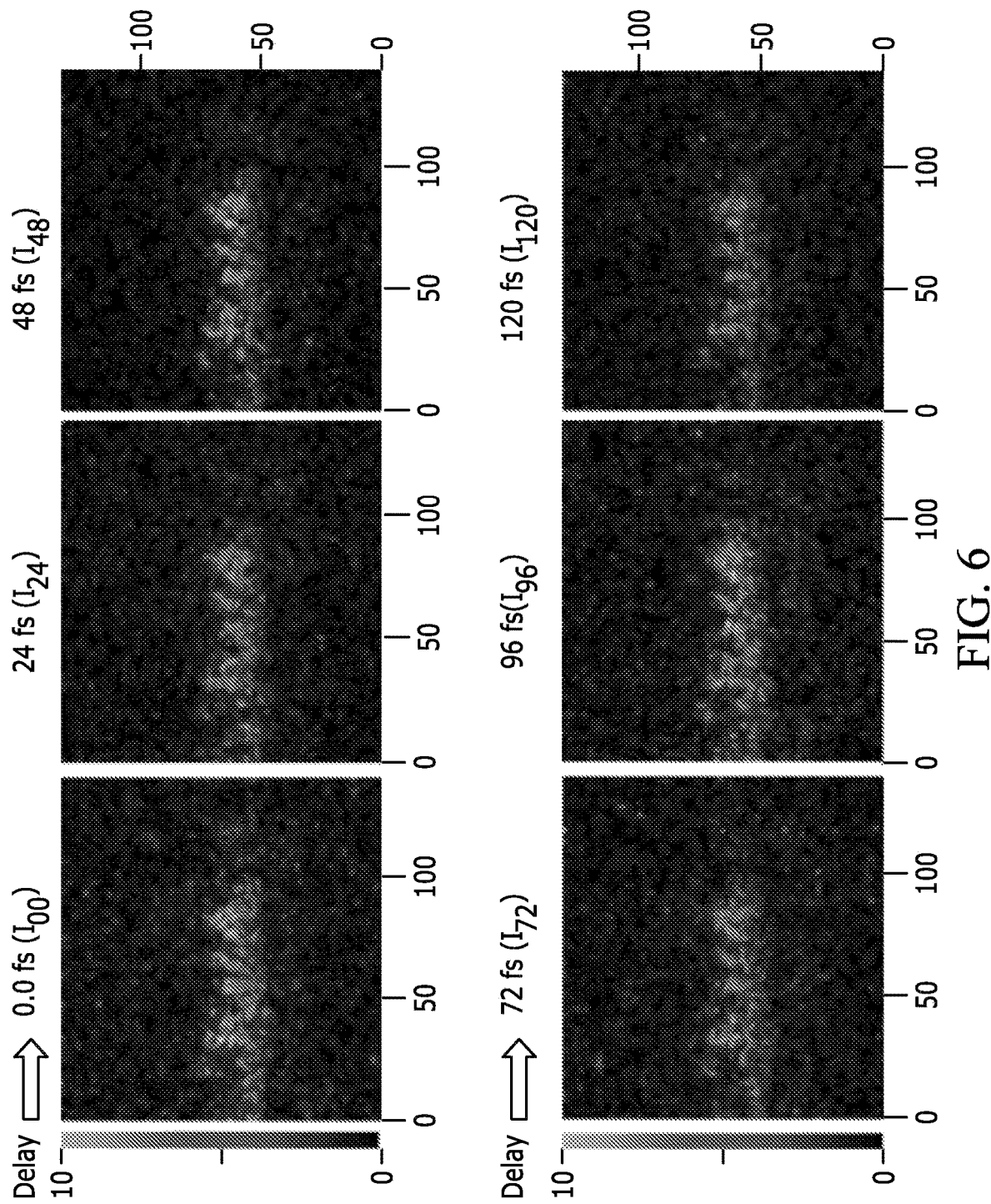
FIG. 6 presents a series of images of microcrystalline aggregates of bis[18]-annulene in a cast film at different signal-idler delays as obtained by the ETPA microscopy system of FIG. 1, in accordance with an example.

The quantum interference effect in the ETPA microscopy system 100 was measured by imaging a bis[18]-annulene (BT) cast film sample with different delays applied by the delay line 107. The macroscopic fluorescence of the BT sample showed a non-monotonic dependence on the delay time between biphoton components (i.e., signal and idler delay). The non-monotonic dependence of the fluorescence results from the quantum path interference effects for the entangled photon pair absorption, and further, the interference provided a strong indication of the entangled photon origin of the signal in the macroscopic experiment. FIG. 6 presents a series of images of microcrystalline aggregates of bis[18]-annulene in a cast film at different signal-idler delays as obtained by the ETPA microscopy system 100. Microscope scanning regimes with relatively small number of pixels and moderate spatial resolution to collect sufficient amount of the fluorescence photons per pixel and reduce statistical error were implemented in capturing the images of FIG. 6. For the images of FIG. 6, a pixel resolution of 128×128 with the pixel dwell time 0.32 ms was used. At each delay time position, a series of 1000 image frames were collected and integrated with the total collection time, for a given time delay, of a few hours. The total collection time at each delay between two photons was about 2 hours. The total collection time the entire set of six delays was ~12 hours. The images of FIG. 6 were noisy even at long scanning times due to weak efficiencies of entangled photon induced fluorescence. Still yet, the images of FIG. 6 illustrate the dependence of the image structure and intensity on the signal to idler delay. The fluorescence intensity at particular positions of the sample 102 under the objective 117 showed non-monotonic dependence on the delay between the components of the biphoton pair.

Figure 7:
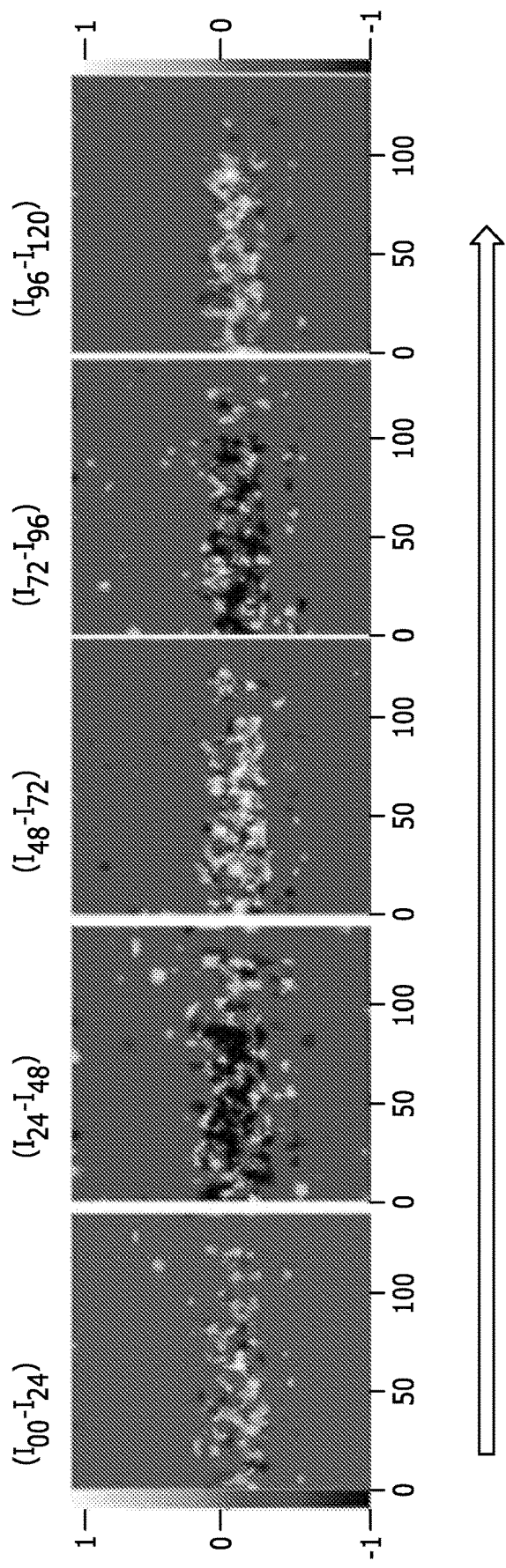
FIG. 7 presents a set of differential images constructed by subtracting the image I$_{\tau_i}$ obtained with time delay $\tau_i$ from an image I$_{\tau_k}$ obtained with a time delay $\tau_k$ with k–i=1, in accordance with an example.

To better demonstrate the non-monotonic dependence of the image feature on the signal-idler delay, FIG. 7 presents a set of differential images that were constructed by subtracting the image $I_{\tau i}$ obtained with time delay $\tau_i$ from an image $I_{\tau k}$ obtained with a time delay $\tau_k$ keeping k−i=1. After normalizing to the background, the differential images showed the apparent signal sign reversal for particular image areas when the signal-idler delay was gradually increased from 0 to 120 fs. The sign reversal in differential images is illustrative of the non-monotonic character of the dependence of the ETPA fluorescence on the signal-idler delay, which is specific to the ETPA process. The difference between each set of two images was normalized to a value of positive 1 for positive differential values, and negative 1 for negative differential values. Therefore, a value of positive 1 or negative 1 represents a maximum or minimum of constructive interference of the entangled two-photon process, and not an interference between the components of bi-photon pairs.

Figure 8B:
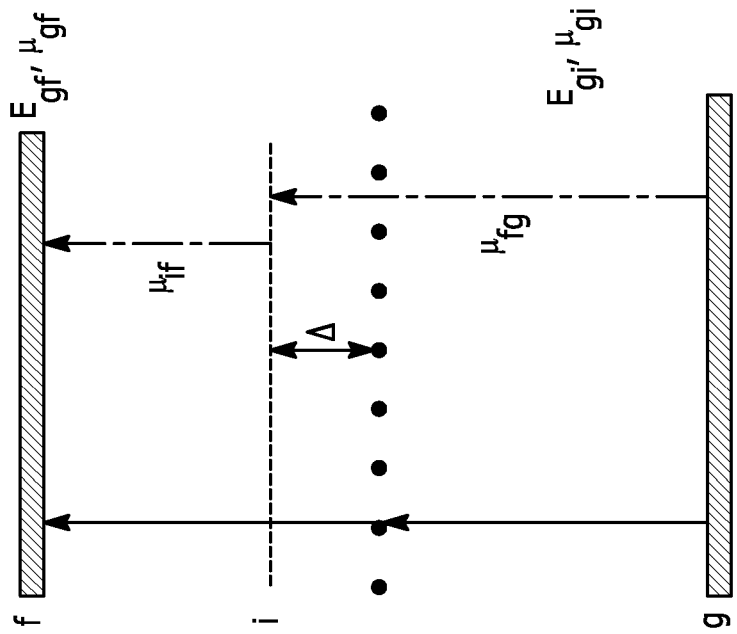
FIG. 8B is an energy band diagram of a BT molecule assuming a single dominant intermediate level in a two-photon transition, in accordance with an example.
Figure 8A:
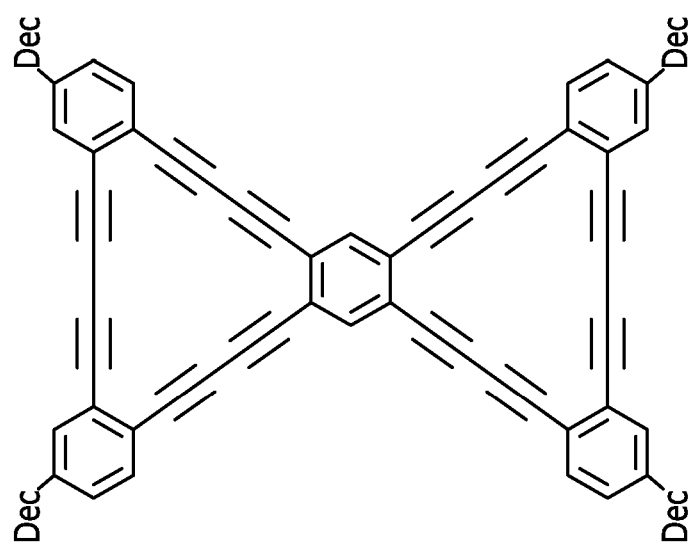
FIG. 8A is a diagram of a biz[18]annulene (BT) molecule used in the ETPA imaging, in accordance with an example.

The theoretical modeling of the ETPA is a challenging task even for small organic molecules. Reasonable predictions on the non-monotonic dependence of the ETPA process may be made using only the dominant pathway's energies. The BT molecule did not show an appreciable charge transfer character, and in the modeling of the ETPA, permanent dipole pathways may be neglected in virtual-state two-photon excitation pathways. Typically, there are intermediate energy levels between a ground state and a two-photon excited state of a molecule. As described herein, intermediate levels may also be referred to as virtual states or virtual energy states. The entangled photon absorption process can be described by using an intermediate level with high probability transition moments. The term "dominant pathway", as used herein, refers to a two-photon excitation process in a molecule according to a pathway through excitation of a single high probability transition moment intermediate level (i.e., a transition pathway having a high probability of population or a high probability of excitation via the pathway). FIG. 8A is a diagram of the BT molecule used in the ETPA imaging herein. FIG. 8B is an energy band diagram of the BT molecule assuming a single dominant intermediate level in a two-photon transition with a monochromatic pump at frequency $\omega_p$. The delay time dependence of the ETPA cross-section $\sigma_e$ may be determined by $$\sigma_e = \frac{\pi \omega_p^2}{16 A_e T_e} \delta(\epsilon_f - \epsilon_g - \epsilon_p) \qquad \text{EQ. 1}$$
$$\left(\frac{\mu_{gi}\mu_{if}}{\Delta}\right) \times [4.5 - 4\cos(\Delta T_e)\cos(\Delta \tau) + 0.5\cos(2\Delta \tau)]$$

where $A_e$ and $T_e$ are entanglement area and entanglement time, respectively, $\epsilon_g$ and $\epsilon_f$ are the energy of a ground and excited state, respectively, $\Delta = \epsilon_i - \epsilon_g - \omega_p/2$ is the detuning energy for an intermediate state having an energy $\epsilon_i$, and $\mu_{gi}$ and $\mu_{if}$ are transition dipole matrix elements for gi and if state transitions, as illustrated in FIG. 8B. Using EQ. 1, the fluorescence may be used to monitor the excited state population created by entangled photon pairs. The fluorescence may originate from relaxation from the excited state to a lower energy state, and therefore may not be affected by the non-classical nature of the excitation light in any way other than by the population of the excited state.

Figure 9A:
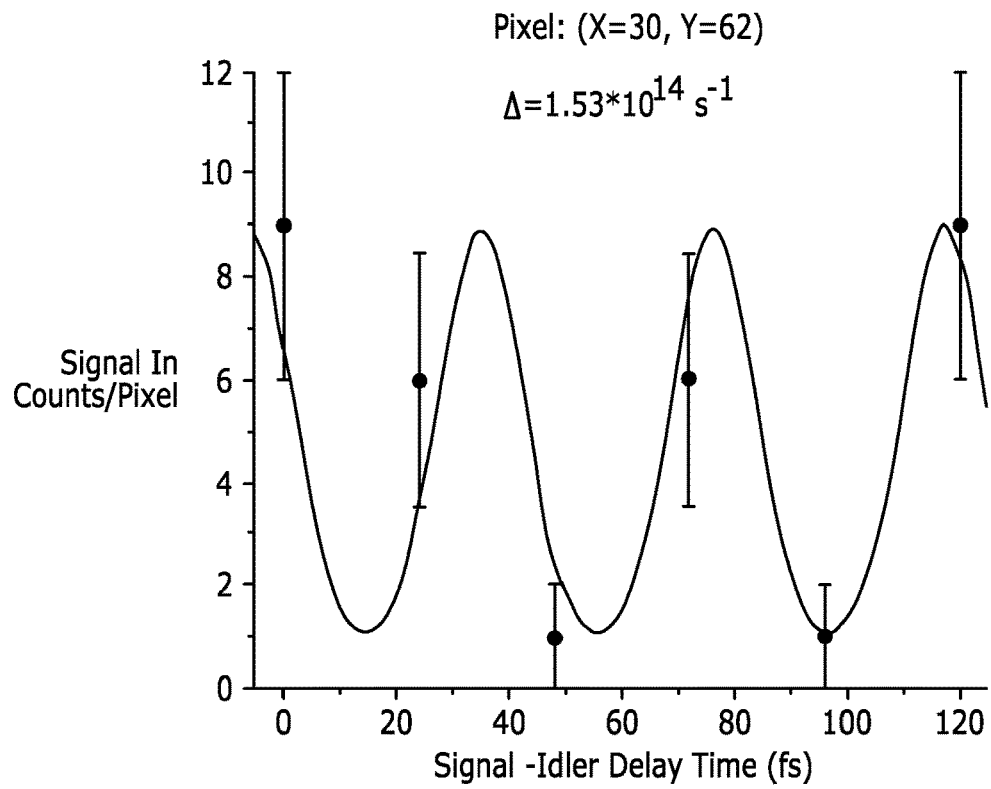
FIG. 9A is a plot of signal counts per pixel and a fit of theoretical fluorescence dependence on signal-idler delay at a first pixel location, in accordance with an example.
Figure 9B:
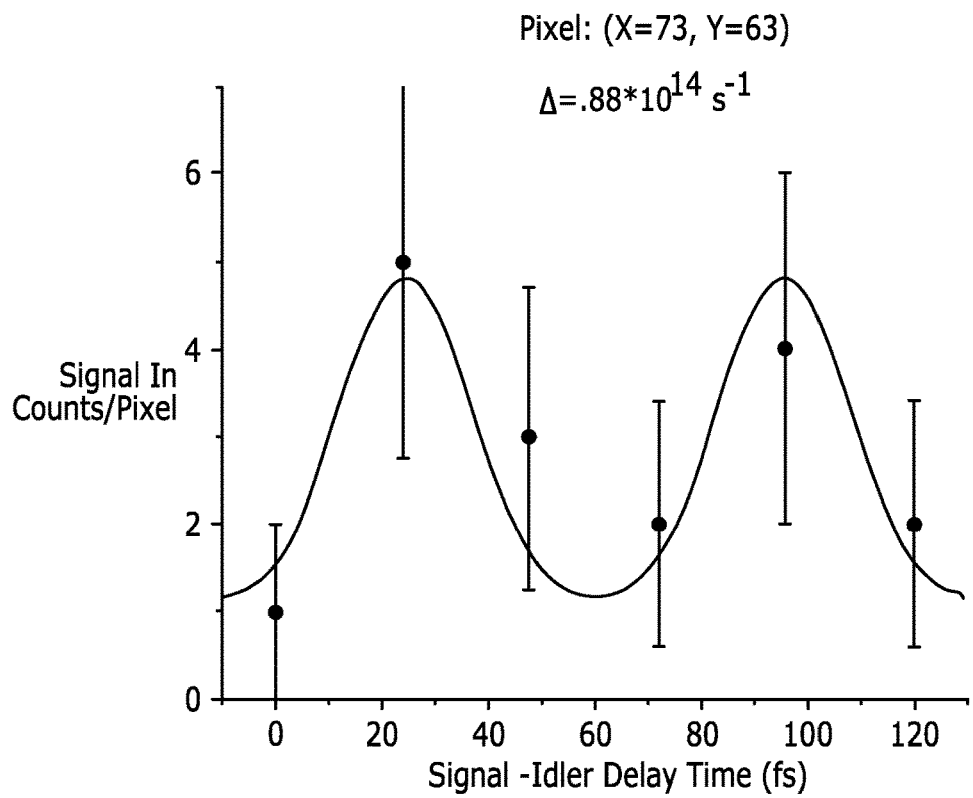
FIG. 9B is a plot of signal counts per pixel and a fit of theoretical fluorescence dependence on signal-idler delay at a second pixel location different than the pixel location of FIG. 9A, in accordance with an example.

FIGS. 9A and 9B are plots of signal counts per pixel and a fit of theoretical fluorescence dependence on signal-idler delay according to EQ. 1 at two different pixel locations. In generating the theoretical fit, a product of the transition dipole matrix elements $\mu_{gi}$ and $\mu_{if}$, and the detuning $\Delta$, were adjustable parameters in the fitting procedure. The detuning parameter $\Delta$ was determined to have different values at different locations of the sample (i.e., at different pixels of an image). The plots of FIGS. 9A and 9B show data from two different sample locations having the coordinates X=30, Y=65 and X=73, Y=63, respectively, in pixels numbers for 128×128 pixel images. The detuning parameter was estimated to be $1.53*10^{14}$ s$^{-1}$ and $0.88*10^{14}$ s$^{-1}$, respectively for the images of FIGS. 9A and 9B. While the detuning parameters $\Delta\square$ for different positions on the sample vary, they are similar, by an order of magnitude, to the detuning parameter $\Delta = 0.78*10^{14}$ s$^{-1}$ obtained in macroscopic experiments with the same BT molecule in a liquid solution.

The non-monotonic delay fluorescent image dependence illustrated by FIGS. 7, 9A, and 9B results from quantum interference effects associated with the entanglement of the generated photon pairs and is not observable or exhibited by, classical light. The specific delay dependence provides an indication that images observed in the ETPA microscopy systems described herein are selectively produced by the entangled photon pairs. The drop cast film of the BT imaged by the ETPA microscope system 100 contains aggregates of the BT as well as isolated molecules. The aggregates of different structural arrangements (e.g. J-type, H-type, more complex such as herringbone-type structures) have different electronic properties (e.g., transition moments, energy level positions, etc.). It is expected that characteristics of the delay time dependence (e.g., period, modulation depth, visibility, etc.) should be different for different aggregates in a drop cast sample due to different energy level characteristics at different locations of the sample.

Figure 10:
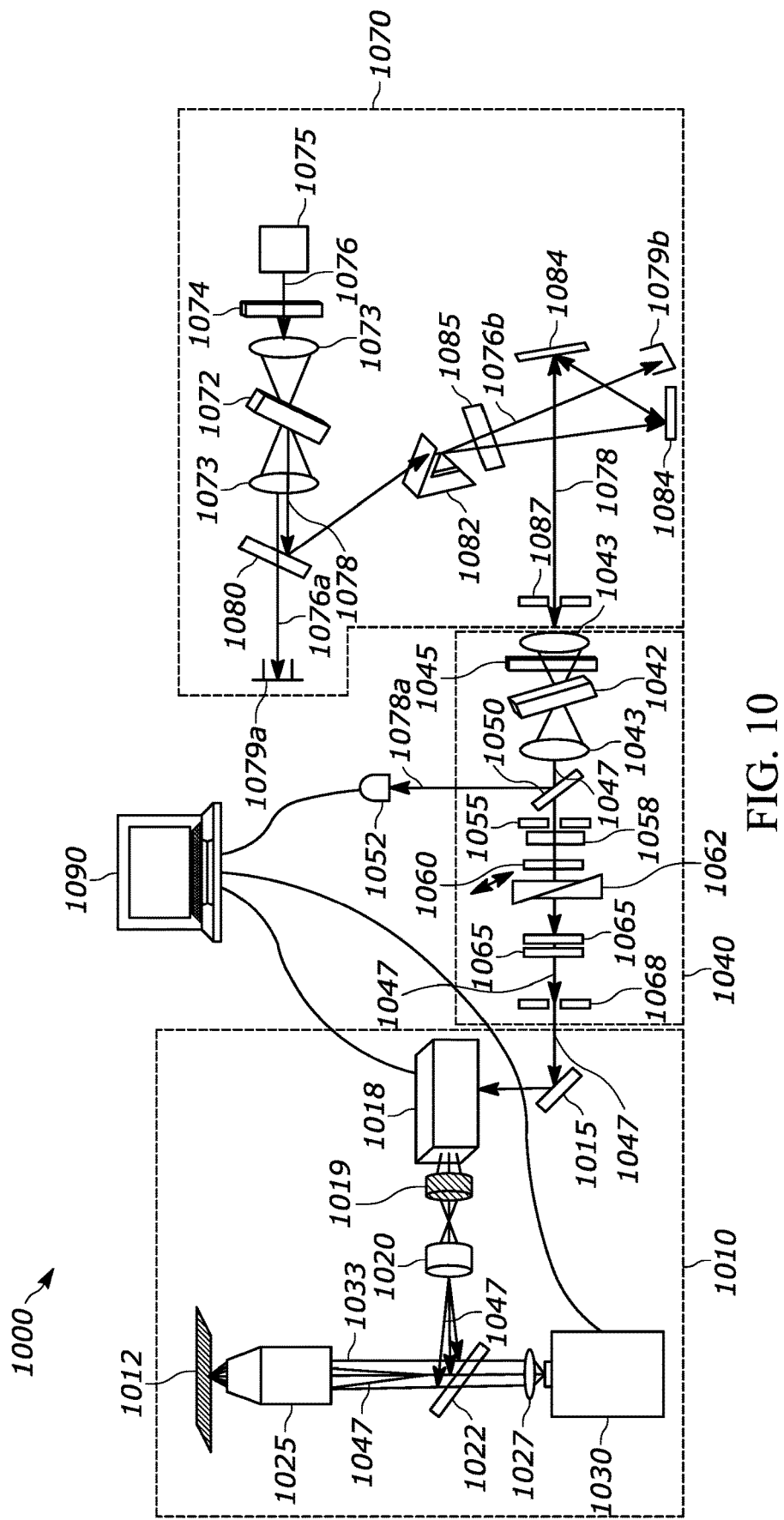
FIG. 10 is a diagram of another example system for performing ETPA microscopy, in accordance with an example.

FIG. 10 is a diagram of an embodiment of a system 1000 for performing ETPA microscopy as described herein. The system 1000 may substantially be implemented as the ETPA system 100 of FIG. 1, but the illustration of FIG. 10 includes additional elements and details. The system 1000 includes a microscopy unit 1010, an SPDC unit 1040, and a pump generation unit 1070. The microscopy unit 1010 includes a plurality of optical and mechanical elements for performing scanning microscopy and capturing images of a sample 1012. The SPDC unit 1040 includes a downconversion element 1042 and associated optics for generating SPDC and providing an SPDC beam 1047 of entangled photon pairs to the microscopy unit 1010, and the pump generation unit 1070 includes a radiation source 1075, a nonlinear element 1072, and associated optical elements for generating pump radiation 1077.

The pump generation unit 1070 includes the radiation source 1075 that is configured to provide pump radiation 1076 to a second harmonic generation (SHG) medium 1072. In a constructed embodiment of the system 1000, the radiation source 1075 was a mode-locked Ti:Sapphire laser (Mai Tai, Spectra Physics, Inc.) configured to provide the pump radiation 1076, with the pump radiation 1076 being femtosecond pulsed pump radiation having a central wavelength of 800 nm. One or more lenses 1073 were configured to focus the pump radiation 1076 into the SHG medium 1072 to convert the pump radiation 1073 to second harmonic radiation 1078 pulses having a central wavelength of 400 nm. In embodiments, the SHG medium 1072 may include barium borate (BBO), periodically-poled (PPLN), unpoled lithium niobate, periodically poled potassium titanyl phosphate (PPKTP), unpoled potassium titanyl phosphate (KTP), or another nonlinear material or medium. A lens 1073 and dichroic mirror 1080 direct the second harmonic radiation 1078 output pulse towards the downconversion element 1042. Residual pump radiation 1076a passes through the dichroic mirror 1080 and is blocked by a beam blocker 1079a to dispose of the residual pump radiation 1076a. A prism 1082 and interference filter 1085 are used to further separate the second harmonic radiation 1078 from the fundamental pump radiation 1076 resulting in a beam of second residual pump radiation 1079b. A second beam blocker 1079b is disposed to block the second residual pump radiation 1079b. Mirrors 1084 direct the second harmonic radiation 1078 through an aperture 1087 to provide the second harmonic radiation 1078 to the SPDC unit 1040.

The SPDC unit 1040 received the second harmonic radiation 1078 from the pump generation unit 1070. Two lenses 1043 were configured to focus the second harmonic generation 1043 into, collimate the radiation 1043 from, the downconversion element 1042. A bandpass filter 1045 was disposed along the optical path, before the downconversion element 1042, to further filter out undesired wavelengths of radiation from entering the downconversion element 1042. The downconversion element 1042 converted the second harmonic radiation 1087 to SPDC photon pairs as the SPDC beam 1047. In embodiments, the downconversion element may include one or more waveguides or bulk crystals of PPLN, bulk lithium niobate, PPKTP, BBO, or another nonlinear material or medium. In the embodiments being described, the downconversion element was a bulk BBO crystal. A dichroic mirror 1050 was disposed along the optical path configured to reflect residual second harmonic radiation 1078a which was detected by a photodetector 1052. The photodetector 1052 provided a signal indicative of the detected residual second harmonic radiation 1078a to a processor 1090. The processor 1090 may use the signal indicative of the detected residual harmonic radiation 1078a for determining an amount of generated photon pairs in the SPDB beam 1047, measuring SPDC efficiencies, determining losses in the system 1000, and/or for measuring and monitoring other metrics of the SPDC unit 1040 and pump generation unit 1070. The SPDC beam 1047 passes through an aperture 1055 and an interference long pass filter 1058, having a cut-on wavelength at 750 nm, was used to remove any remaining 400 nm second harmonic radiation.

A half wave plate 1060 was used to manipulate the polarizations of signal-idler pairs of photons of the SPDC beam 1047, and a tunable delay line 1062 was disposed along the optical path to provide a relative temporal delay between the signal-idler photon pairs. The tunable delay line 1062 was a precise polarization-dependent delay line based on birefringent material wedges inserted between the downconversion element 1042 of the SPDC unit 1040 and the microscope input 1010. The delay line 1062 included a pair of 25 mm×20 mm×15 mm crystalline quarts wedges. A first wedge was permanently fixed in place while a second wedge was mounted on a delay line stage that could translate the second wedge along an axis parallel to the long faces of the wedges (i.e., along the common diagonal direction of the diagonal faces of the first and second wedges as illustrated in FIG. 10). Each component of an SPDC photon pair (i.e., the signal photon being a one component, and the idler photon being another component) has an orthogonal polarization relative to the other component of the photon pair. As such, the relative temporal delay between the two orthogonally polarized components was determined by the difference of corresponding refractive indexes of quartz for ordinary and extraordinary light, and the amount of quartz material of the tunable delay line 1062 that was in the light path. In order to compensate for the signal-idler delay produced in type-II BBO crystal (e.g., the downconversion element 1042), and for the non-zero thickness of the wedged configuration of the delay line 1062 at minimum delay, a pair of properly oriented crystalline quartz plates 1065 having thicknesses of 3.4 mm+2.0 mm were introduced in the optical path. The delay line used in the microscope measurements and imaging experiments described herein was capable of producing a variable temporal delay between orthogonally polarized biphoton components (i.e., signal-idler photon pairs) with an accuracy of 0.02 fs per step of the motorized delay line. Finally, the time delay photon pairs of the SPDC beam 1047 passed through an aperture 1068 before being provided to the microscopy unit 1010.

To evaluate the performance of the SPDC unit 1040, downconverted photos of the SPDC beam 1047 were measure by either a silicon avalanche photodiode (APD) coupled to single photon counting modules (Perkin-Elmer SPCM-AQR-13), or by a CCD camera (ST-402, SBIG Astronomical Instruments). The SPDC unit 1040 was able to produce $1.2*10^7$ photons/s output flux (singles) and showed a signal-idler coincidence rate up to $1.5*10^6$ coincidence counts/s. With type-II SPDC phase matching conditions of the BBO downconversion element 1042, the signal (o-ray) and idler (e-ray) photons were generated at orthogonal polarizations. Polarization visibility measurements were performed using a 50/50 non-polarizing beamsplitter and two polarizers placed in two individual APD optical paths, one path for measuring the signal photons, and another path for measuring the idler photons. A polarization visibility of approximately 88.5% was measured. The results of the polarization visibility and coincidence rate measurements showed that a two-photon quantum state was generated in the collinear configuration type-II SPDC in 1 mm thick BBO crystal (i.e., the downconversion element 1042).

The microscopy unit 1010 received the SPDC beam 1047 as excitation radiation for exciting the sample 1012 for imaging of the sample 1012. A mirror 1015 directed the SPDC beam 1047 to a spatial scanner 1018. The spatial scanner 1018 was configured to scan the transverse position of photons of the SPDC beam 1047 for probing different parts of the sample 1012 for imaging of the sample 1012. In embodiments, the scanner 1018 may be a galvo-galvo scanner having galvo-mirrors and scanning lenses 1018 and 1019 configured to raster scan the SPDC beam 1047 across the sample 1012. A dichroic beam splitter 1022 with high reflection at 800 nm directed the SPDC beam toward a microscope objective 1025 and the scanner 1018 scanned the SPDC beam 1047 across the objective 1025 at the overfilled back aperture. The objective 1025 was a 0.4 NA microscope objective lens, but it is envisioned that other microscope objectives having different magnifications and backfill apertures may be used. The objective 1025 focuses the SPDC beam 1047 onto the sample and the SPDC beam 1047 excites the sample 1012 causing the sample to fluoresce releasing fluorescent radiation 1033. The fluorescent radiation 1033 from the sample 1012 was epi-collected by the microscope objective 1025 and dichroic beamsplitter 1022 transmitted the fluorescent radiation 1033. Two filters (not illustrated, FF02-409/LP, Semrock Inc. and 750 nm, OD 4 Shortpass Filter, Edmund Optics) further filtered out any other noise or residual radiation and a lens 1027 focused the fluorescent radiation 1033 into a cooled photo-multiplier tube 1030 (PMT) (R7518P, Hamamatsu Photonics). The PMT 1030 detected the fluorescent radiation 1033 and provided a signal indicative of the detected fluorescent radiation 1033 to the processor 1090.

In embodiments, the processor 1090 may be communicatively coupled to one or more elements of the system 1000. For example, the processor 1090 may be in communication with the scanner 1018 to provide control of the scanner for performing raster scans of the sample 1012 (e.g., turning on/off the scanner 1018, controlling a position of the scan of the scanner, etc.). The processor 1090 may also receive feedback from the scanner 1018 pertaining to a current scanning position of the scanner 1018, an error, an operational status, a temperature, or another metric or operational parameter of the scanner 1018. Further, the processor 1090 may be in communication with the PMT 1030, photodiode 1052, tunable delay line 1062, and/or other components of the system 1000 for controlling elements of the system, and/or for receiving signals from the elements.

Using the system 1000 of FIG. 10, ETPA fluorescence images of various organic cast film samples were obtained. FIGS. 11A and 11B are ETPA and classical TPA images, respectively, of a biz[18]annulene (BT) drop cast film having the molecular structure illustrated in FIG. 11C. FIGS. 11D and 11E are ETPA and classic TPA images, respectively, of a flavin mononucleotide (FMN) drop cast film having the molecular structure illustrated in FIG. 11F. FIGS. 11G and 11H are ETPA and classic TPA images, respectively, of a anicotinamide adenine dinucleotide (NADH) drop cast film having the molecular structure illustrated in FIG. 11I. The ETPA images were obtained by collecting images in 128× 128 square pixel frames and collecting between 1000 to 2000 frames for each image. The sum of the signals in each pixel was taken over all collected frames. The background signal, with the laser pump blocked, was found to be about 0.3-1 photons per pixel depending on the number of frames and microscope alignment conditions of the system 1000. The ETPA-induced microscope fluorescence images obtained (i.e., FIGS. 11A, 11D, and 11G) were compared with the images collected under weak classical one-photon and two-photon excitation at 400 nm (i.e., FIGS. 11B, 11E, and 11H). For classical 800 nm two-photon measurements, we adjusted the fundamental coherent laser beam from Mai Tai femtosecond laser to the average flux level $10^{12}$-$10^{14}$ photons/s (sub-milliwatt range) in order to produce about the same fluorescence intensity detected by the microscope as that obtained with much weaker entangled photon excitation. The ETPA microscope images of FIGS. 11A-11I required 1,000,000 times less excitation flux to obtain the images than the corresponding TPA images.

Figure 12:
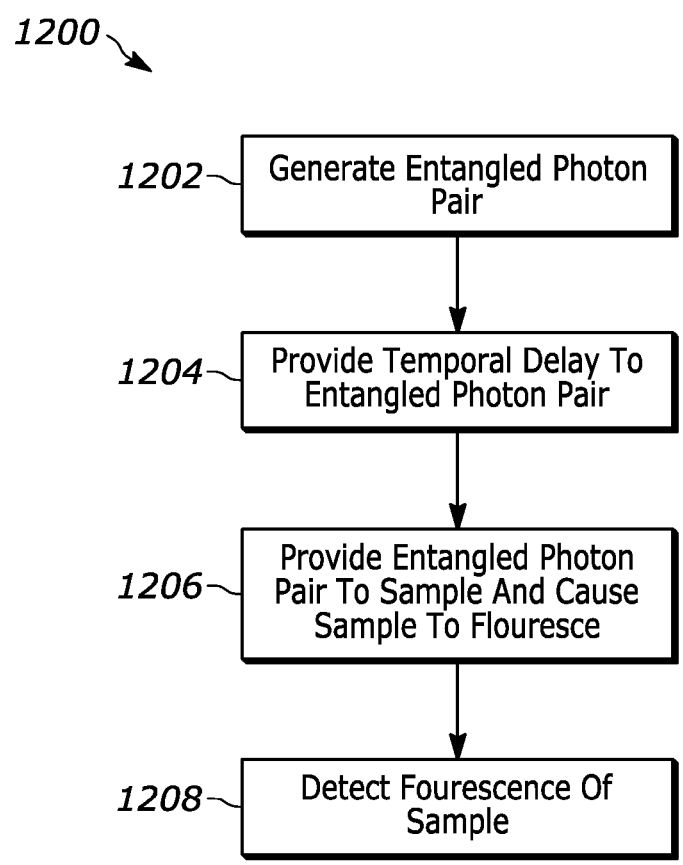
FIG. 12 is a flow diagram of a method for performing ETPA microscopy, in accordance with an example.

FIG. 12 is a flow diagram of a method 1200 for performing ETPA microscopy as described herein. For clarity, the method 1200 of FIG. 12 will be described with simultaneous reference to FIG. 1. The method includes generating an entangled photon pair (block 1202). The entangled photon pair may be generated by the entangled photon source 105, or by another photon source. The method 1200 further includes providing the entangle photon pair to the delay line 107 and applying a temporal delay to the entangled photon pair (block 1204). The delay line 107 may apply a different temporal delay to different components of the entangled photon pair (i.e., a signal photon and an idler photon). Therefore, the delay line 107 may provide a relative temporal delay between the photons of the entangled photon pair.

The entangled photon pair is then provided to the sample 102 (block 1206). The photon pair may be directed toward the sample 102 by various optics and by the scanner 110. The scanner 110 may be configured to alter the trajectory of the photons of the entangled photon pair to provide the entangled photon pair to different regions or areas of the sample 102. For example, the scanner 110 may include one or more mirrors that are able to alter the direction of the entangled photon pair to provide the photon pair to the sample 102 at different transverse locations of the sample 102. In an embodiment, the scanner 110 may raster scan the entangled photon pair across the sample 102 in a transverse plane of the sample 102.

The sample 102 absorbs the entangled photon pair and the sample 102 fluoresces. The detector 112 detects the fluorescence and generates a signal indicative of the fluorescence (1208). The detector 112 may be configured to provide the signal to a processor for further processing of the signal. For example, the detector 112 may be configured to provide the signal to the processor 1090 of FIG. 10, and the processor 1090 may be configured to generate an image from the signal. The processor 1090 may receive a plurality of signals from the detector 112 with each signal being indicative of fluorescence detected with the fluorescence being emitted from one or more regions of the sample 102. The processor 1090 may generate an image having pixels, with each pixel being indicative of fluorescence received from a region of location of the sample 102. The processor 1090 may generate a plurality of images of the sample 102 and the processor may perform image processor to generate an image, store the image in a memory or on a network, and/or display the generated plurality of images to a user. For example, the processor 1090 may normalize each image to a background noise level of each image, and/or the processor may generate one or more differential images from the plurality of images with each differential image being the result of a differential process between two or more images of the plurality of images.

Figure 13:
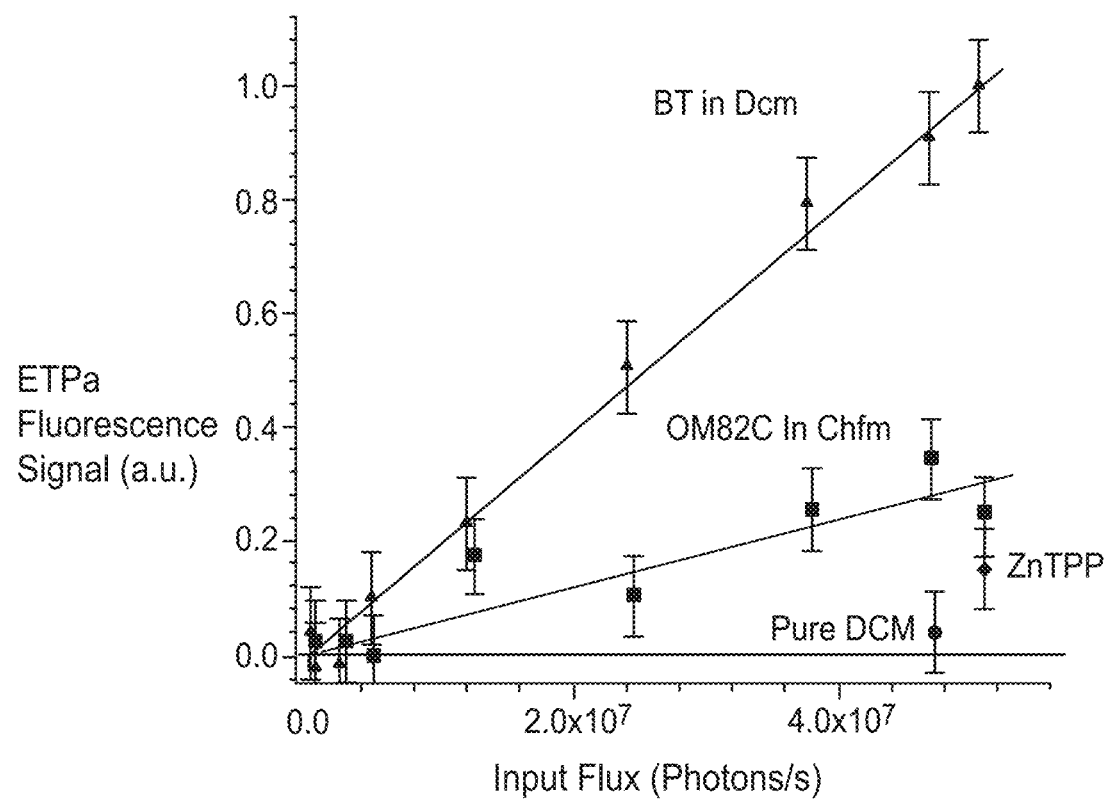
FIG. 13 is a plot of ETPA fluorescence versus input flux of excitation entangled photon pair beams for three different fluorophores, in accordance with an example.

The ETPA microscopy system 1000 of FIG. 10 was used to image various organic molecules as the sample 1012. FIG. 13 is a plot of ETPA fluorescence versus input flux of excitation entangled photon pair beams. The fluorescence is normalized to the maximum number of the detected fluorescence photons. The plot shows the linear dependence of the fluorescence of the molecules on the input flux in photons per second. The three organic molecules of FIG. 13 were bis-annulene (BT) in a drop cast film, thiophene dendrimer in chloroform solvent (OM 82C), and zinc tetraphenylporphyrin (ZnTPP). The ETPA cross section, $\sigma_E$, for the BT, OM 82C, and ZnTPP was $5.4 \times 10^{-18}$ cm$^2$, $2.6 \times 10^{-18}$ cm$^2$, and $8 \times 10^{-18}$ cm$^2$, respectively. Further, the fluorescence quantum yield, taken as fluorescent flux divided by the input flux, was 0.45, 0.74, and 0.04 for the BT, OM 82C, and ZnTPP, respectively.

Figure 14A:
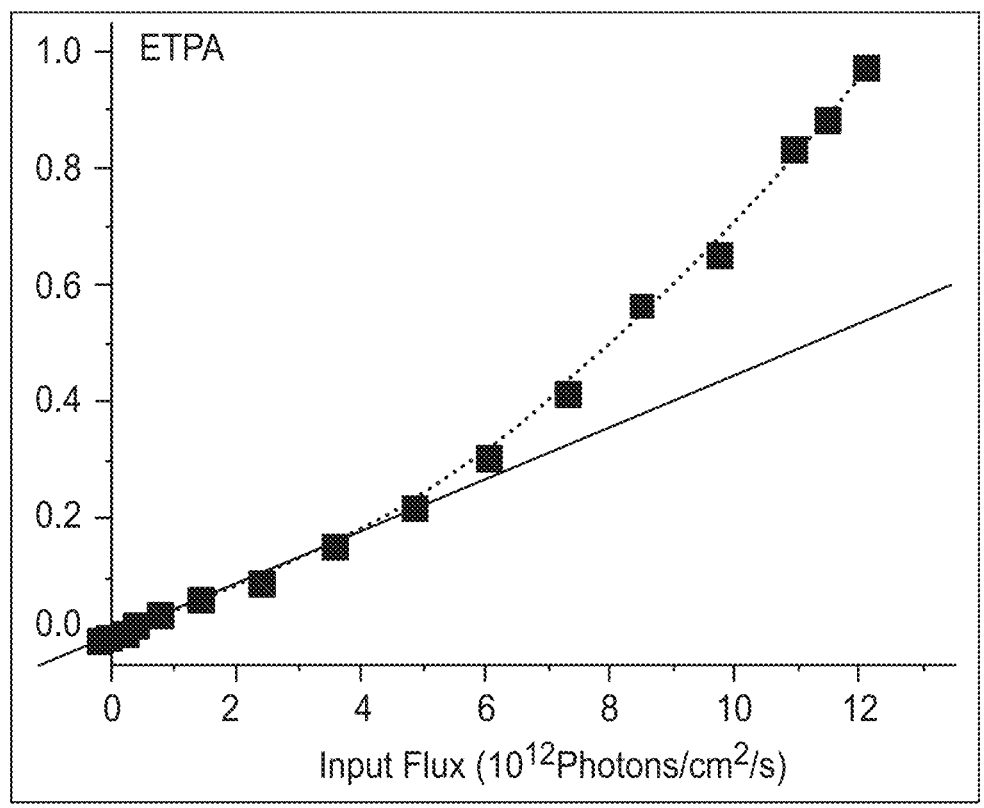
FIG. 14A is a plot of normalized absorbed photon rate versus input flux for ETPA of an organic molecule, in accordance with an example.
Figure 14B:
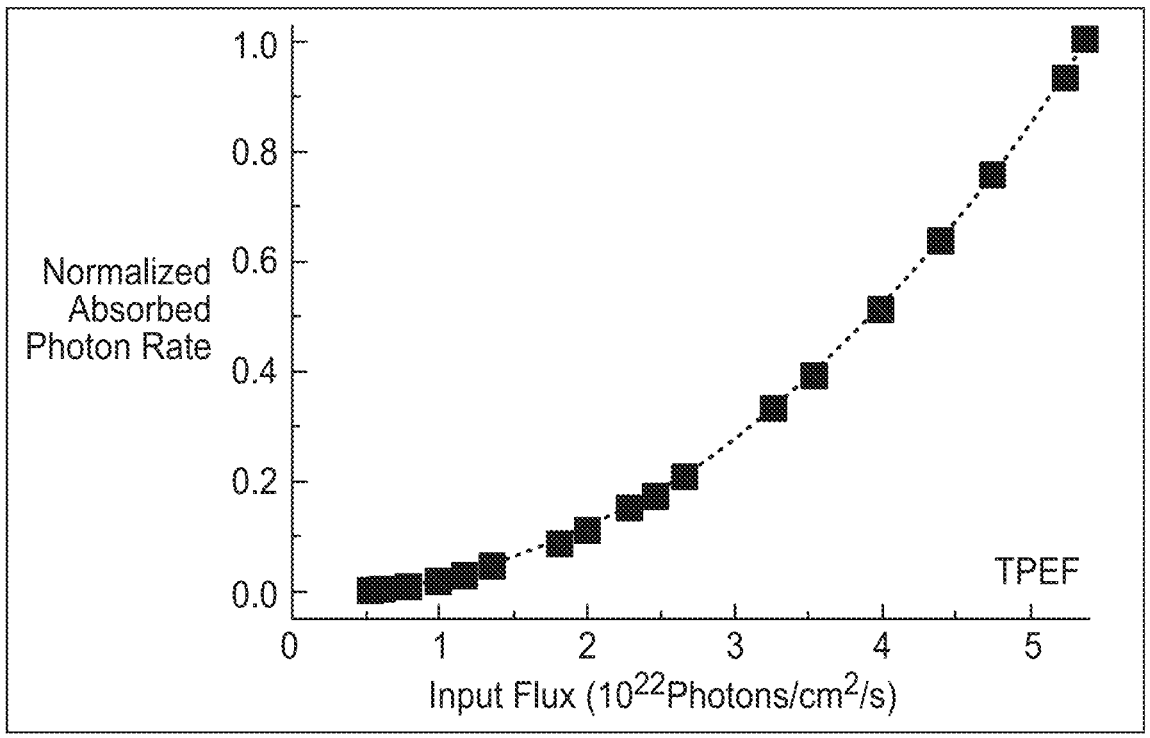
FIG. 14B is a plot of normalized absorbed photon ate versus input flux for classical TPA, in accordance with an example.

FIG. 14A is a plot of normalized absorbed photon rate versus input flux for ETPA of an organic molecule, and FIG. 14B is a plot of normalized absorbed photon ate versus input flux for classical TPA. By comparing the data presented in FIGS. 14A and 14B, it is apparent that ETPA requires an input flux that is ten orders of magnitude less than classical TPA to achieve a same photon absorption rate. Therefore, it is envisioned that in some embodiments of ETPA microscopy systems, images may be captured that require input fluxes that are ten orders of magnitude, or more, less than an image obtained by classical TPA microscopy. ETPA microscopy may also be useful for performing spectroscopy of samples. By controlling certain characteristics of entangled photons generated by SPDC, different energy levels of a sample may be probed, which other spectroscopic techniques are unable to achieve. The described control of the excited states may be useful for probing energy levels of molecules for spectroscopy, and for controlling photochemical reactions. Further, the described tuning of the probing energy of entangled photon pairs allows for characterizing of molecules that have virtual energy levels and excitation pathways that are otherwise unable to be probed using other two-photon absorption imaging methods.

Figure 15:
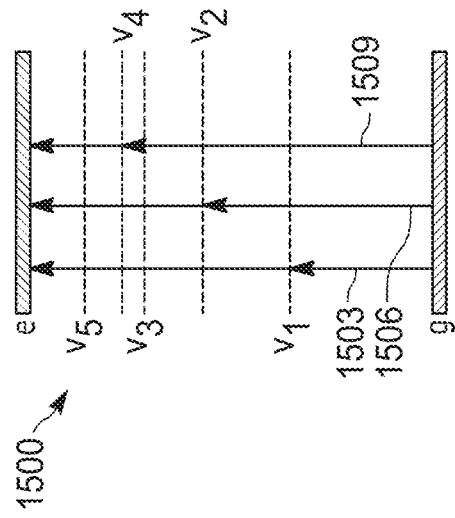
FIG. 15 is an example energy band diagram of a molecule having a ground energy state, g, an excited energy state, e, and multiple virtual energy states, $v_1$ through $v_5$, in accordance with an example.

FIG. 15 is an example energy band diagram 1500 of a molecule having a ground energy state, g, an excited energy state, e, and multiple virtual energy states, $v_1$ through $v_5$. The ground energy state has the lowest energy of the system, the excited energy state has the highest energy value of the system as illustrated, and the virtual states each have energy values between the energies of the ground and excited states with increasing energy values from $v_1$ to $v_5$. The diagram 1500 also includes a first absorption pathway 1503, a second absorption pathway 1506, and a third absorption pathway 1509. The first absorption pathway 1503 excites the molecule to the excited state through virtual state $v_1$. An excitation of the molecule according to the first pathway 1503 may occur with an entangled photon pair having a specific entanglement time $T_e$. Further, the second and third absorption pathways each excite the molecule through virtual states $v_2$ and $v_3$ respectively, which may be accomplished with entangled photon pairs having different entanglement times as compared to a transition through the first pathway 1503. Therefore, the previously described ETPA microscopy systems 100 and 1000 may tune the entanglement time of generated entangled photon pairs to probe the various energies of the virtual states. While illustrated as having a single excited energy, e, molecules and other materials may have different pathways that excite the molecule to different excited energy states. Probing of the virtual states illustrated in FIG. 15 is not possible using a classical TPA microscopy system or spectroscopy method.

Figure 16B:
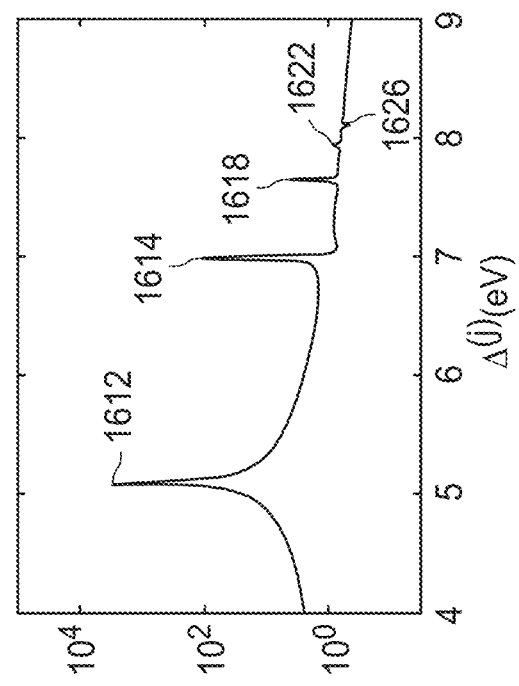
FIG. 16B is a plot of the Fourier transform of the time delay plot of FIG. 16A, in accordance with an example.
Figure 16A:
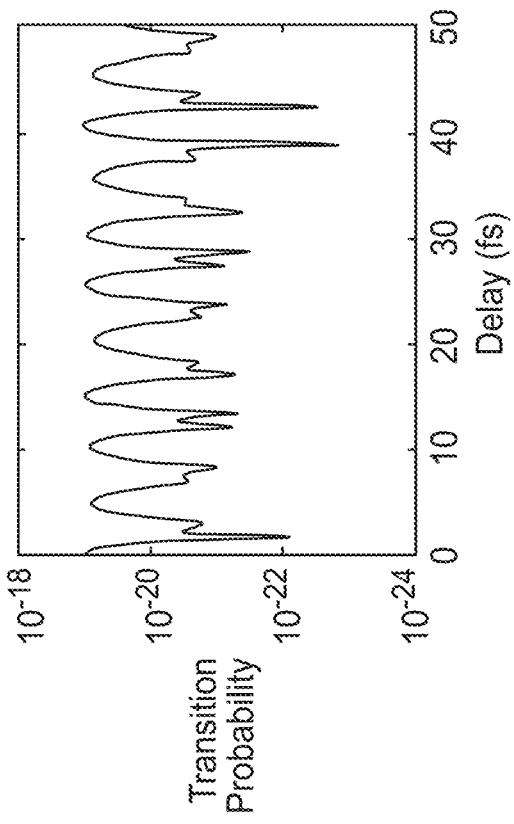
FIG. 16A is a plot of simulated excitation transition probability of a hydrogen molecule versus signal-idler delay of an SPDC bi-photon pair, in accordance with an example.

FIG. 16A is a plot of simulated excitation transition probability of a hydrogen atom versus signal-idler delay of an SPDC bi-photon pair. FIG. 16A illustrates a non-monotonic dependence of the transition probability of the delay. The multiple minima and maxima of the transition probability are indicative of quantum interference due to detuning energies of the bi-photon pair which is due to the energies of the entangled photons and the entangled two-photon cross-section of the hydrogen being probed. FIG. 16B is a plot of the Fourier transform of the time delay plot of FIG. 16A. FIG. 16B presents an entanglement cross section of the bi-photon pair versus detuning energy, which is derived from the frequency as derived by the Fourier transform. The peaks 1612, 1614, 1618, 1622, and 1626 are indicative of the virtual states illustrated in FIG. 15. For example, the lowest peak 1612 has the lowest energy of approximately 5 eV, which is indicative of an excitation transition according to the first pathway 1503 via the first virtual state $v_1$. Accordingly, the second peak 1614 is indicative of excitations via the second pathway 1506, the third peak 1618 is indicative of excitations via the virtual state $v_3$, the fourth peak 1622 is indicative of transitions via the path3way 1509, and the fifth peak 1626 is indicative of transitions via the fifth virtual state $v_5$. Therefore, by tuning the time delay of the entangled photon pair, the a specific virtual state may be probed for determining a presence of a fluorophore, or for monitoring a biological process. The plot of FIG. 16B is one example of a fingerprint of an atom. The plot of FIG. 16B may be considered a spectral profile in energy, or alternatively, the x-axis may be converted to frequency with each of the peaks 1612, 1614, 1618, 1622, and 1626 corresponding to different frequency spectral components of virtual state pathways of the hydrogen atom. While described in reference to a hydrogen atom, a fingerprint, spectral profile, or energy profile may be generated using the described methods and systems, for any atom, molecule, or material.

Figures 17A, 17B:
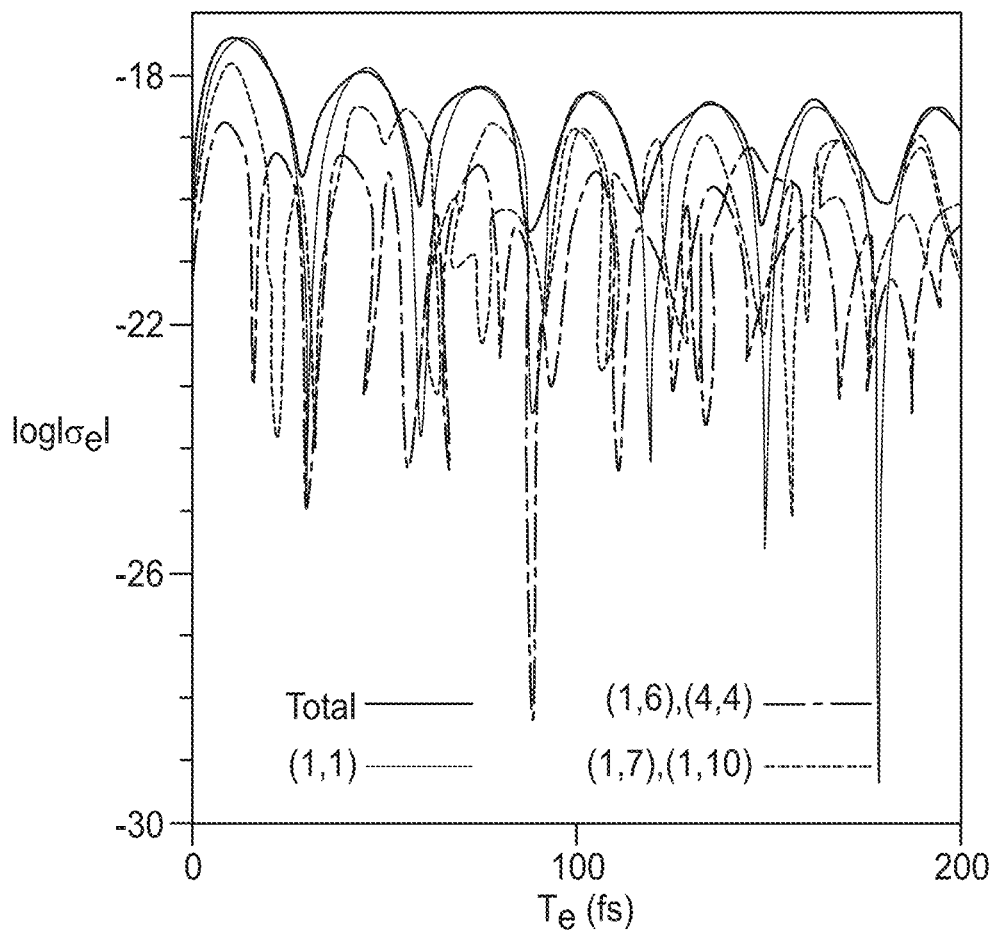
FIG. 17A is a plot of entanglement cross section versus entanglement time, $T_e$, for ETPA in a thiophene dendrimer, in accordance with an example.
FIG. 17B presents a table of the measured experimental entanglement cross-section values determined from the data illustrated in the plot of FIG. 17A, and the theoretically determined entanglement cross-section values for an entangled photon pair in the thiophene dendrimer, in accordance with an example.

FIG. 17A is a plot of entanglement cross section versus entanglement time, $T_e$, for ETPA in a thiophene dendrimer. The entanglement cross section was determined from the measured fluorescence transition probability of the thophene dendrimer at various signal-idler bi-photon entanglement times using EQ. 1. FIG. 17B presents table 1750 of the measured experimental entanglement cross-section values determined from the data illustrated in the plot of FIG. 17A, and the theoretically determined entanglement cross-section values for an entangled photon pair in the thiophene dendrimer. The table 1750 presents experimental and theoretical data for both a planar thiophene dendrimer, and a twisted thiophene dendrimer. The measured and theoretical values reported in the table 1750 show good agreement indicating that the described methods and systems are reliable according to the theory for probing of virtual states of molecules and for performing spectroscopy of molecules.

The described method and systems for performing ETPA microscopy enable the ability to generate a spectral fingerprint (also termed profile) of a molecule that is incapable by classical TPA, and other forms of microscopy or spectroscopy. This spectral fingerprint is formed of absorption of fluorescence corresponding to excitation pathways having different virtual energy states. Knowing a spectral fingerprint of a molecule, including its virtual state transition energies, allows for optimization of a microscopy of spectroscopy system to tune excitation energies of the system for identifying subsequent molecules based on their absorption profiles and for imaging of molecules. For example, determining a highly efficient virtual state excitation transition pathway allows for tuning of excitation photon energies to utilize the efficient pathway, therefore reducing the overall required input power of an excitation energy source. This may further allow for ETPA imaging of samples at even lower input flux values. The described ETPA microscopy and spectroscopy methods described herein may be useful for imaging of biological systems. For example, ETPA spectroscopy can be used to observe virtual energy transitions in flavoproteins, which is unable to be performed by classical TPA and other techniques. Further, the ETPA microscopy can image the flavoproteins at very small concentrations allowing the flavoproteins allowing for imaging of the flavoproteins without requiring introduction of additional chemicals or fluorescent probes, which can disturb and/or change the behavior of some biological systems.

Figure 18:
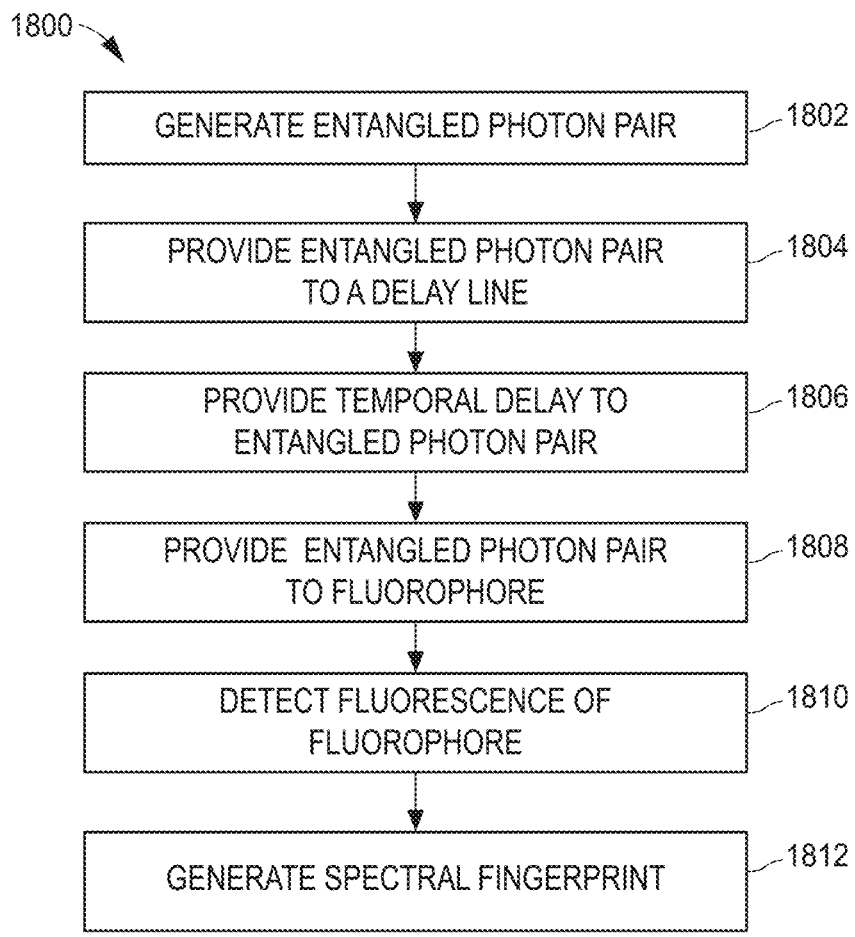
FIG. 18 is a flow diagram of a method for determining a fingerprint of a molecule using ETPA spectroscopy, in accordance with an example.

FIG. 18 is a flow diagram of a method 1800 for determining a fingerprint of a molecule using ETPA spectroscopy as described herein. The method 1800 may be performed by the system 100 of FIG. 1, the system 1000 of FIG. 10, or by another ETPA microscopy system. The method 1800 includes generating an entangled photon pair (block 1802). The entangled photon pair includes a signal photon and an idler photon. The entangled photon pair may be generated via spontaneous parametric downconversion, another nonlinear optical process, or by another means. The entangled photon pair is then provided to a temporal delay line (block 1804). The temporal delay line may include a birefringent delay line, a freespace delay line, a fiber coupled delay line, or another element capable of providing a temporal delay between photons of a photon pair or a group of photons. The temporal delay line provides a temporal delay between the signal photon and the idler photon (block 1806). The entangled photon pair is then provided to a fluorophore (block 1808) to excite the fluorophore. The fluorophore may be excited to an excited state via a pathway of transitions utilizing one or more virtual states of the fluorophore. In embodiments, the fluorophore may have one or more virtual states and the fluorophore may be excited to an excited state via pathways that use one or more of the virtual states. Further, each pathway that utilizes a virtual state has an efficiency associated with the pathway indicative of a population probability of the virtual state. For example, each pathway may have an associated two-photon absorption efficiency. Once excited, the fluorophore de-excites emitting a fluorescence.

The method 1800 further includes detecting the fluorescence from the fluorophore (block 1810). A detector such as a photomultiplier tube may be used to detect the fluorescence. A spectral fingerprint is then determined from the detected fluorescence (block 1812). The spectral fingerprint includes one or more spectral components indicative of one or more virtual states of the fluorophore. In examples, the detector generates a signal indicative of the detected fluorescence and the detector may provide the signal to a processor. The processor may store the signal as data in a memory, on a network, or on another storage medium. The method 1800 may be performed multiple times and the tunable delay line may provide a different temporal delay for each time that the method 1800 is performed. The processor may collect a plurality of signals from the detector with each signal associated with fluorescence detected at a given temporal delay. As such, the processor may determine a two-photon absorption efficiency of the fluorophore at different temporal delays. Further, the fingerprint for the molecule may be generated from the determined two-photon absorption efficiency. For example, the fingerprint may be generated by taking a Fourier transform of the two-photon absorption efficiency, and spectral components such as frequency peaks in the Fourier transform, may be used to determine energies of virtual states of the fluorophore. Once generated, the processor may store the fingerprint in a memory or transmit the fingerprint to another system.

Figure 19:
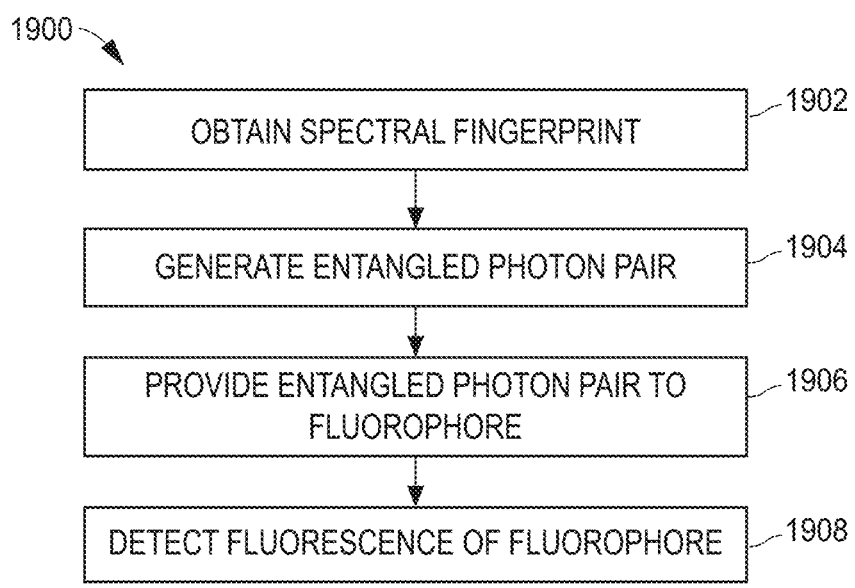
FIG. 19 is a flow diagram of a method for using a fluorophore fingerprint to perform microscopy or spectroscopy of a fluorophore, in accordance with an example.

FIG. 19 is a flow diagram of a method 1900 for probing a fluorophore, either to perform microscopy of the fluorophore, or for performing spectroscopy of the fluorophore. The method 1900 includes obtaining a spectral fingerprint of a fluorophore (block 1902). The fingerprint includes one or more spectral components indicative of one or more virtual states of the fluorophore. The spectral components may be used to determine an energy state of an entangled photon pair, or of a classical photon pair, for exciting the fluorophore via two-photon absorption. The method 1900 further includes, generating a photon pair according to a virtual energy state of the fluorophore, with the photon pair having an energy determined from a spectral component of the fingerprint (block 1904). The photon pair is then provided to a fluorophore, with the fluorophore having the obtained spectral fingerprint, to excite the fluorophore via two-photon absorption (block 1906). The fluorophore then fluoresces and the fluorescence is detected (block 1908). The fluorescence may be detected by a detector that generates a signal indicative of the detected fluorescence and provides the signal to a processor. The processor may further process one or more signals from the detector to generate an image of the fluorophore, or for generating a spectrum of the fluorophore. The method 1900 of FIG. 19 may be useful for performing low excitation energy imaging and spectroscopy of biological samples, flavoproteins, living samples, monitoring biological processes, and material samples as a means.

The following list of aspects reflects a variety of the embodiments explicitly contemplated by the present disclosure. Those of ordinary skill in the art will readily appreciate that the aspects below are neither limiting of the embodiments disclosed herein, nor exhaustive of all of the embodiments conceivable from the disclosure above, but are instead meant to be exemplary in nature.

Aspect 1. A fluorescence probing system comprising:
an entangled photon source to generate an entangled photon pair including an idler photon and a signal photon;
a temporal delay line disposed to create a temporal delay between the idler photon and the signal photon to generate a temporally delayed entangled photon pair;
a coupling stage positioned to probe a sample having a fluorophore with the temporal delayed entangled photon pair to excite a virtual state of the fluorophore; and
a photodetector to detect fluorescent light emitted by the fluorophore and generate a signal indicative of the detected fluorescent light.

Aspect 2. The system of aspect 1, wherein the temporal delay line comprises a birefringent delay line.

Aspect 3. The system of any of aspects 1 to 2, wherein the entangled photon source comprises a nonlinear optical medium and is to generate the entangled photon pair by spontaneous parametric downconversion.

Aspect 4. The system of any of aspects 1 to 3, wherein the entangled photon source is to generate the entangled photon pair comprising near-infrared photons.

Aspect 5. The system of any of aspects 1 to 4, wherein the temporal delay line is to provide a temporal delay of between 0 seconds and 5 picoseconds.

Aspect 6. The system of any of aspects 1 to 5, wherein the temporal delay line is to provide a temporal delay having a temporal resolution of less than 1 femtosecond.

Aspect 7. The system of any of aspects 1 to 6, wherein the detector comprises a photomultiplier tube.

Aspect 8. The system of any of aspects 1 to 7, further comprising a scanner configured to scan the entangled photon pair in a transverse plane across the sample.

Aspect 9. The system of any of aspects 1 to 8, further comprising a controller to adjust the temporal delay between the idler photon and the signal photon over a sampling time to generate a plurality of different temporally delayed entangled photon pairs over the sampling time, each of the plurality having a different temporal delay; and wherein the photodetector is to detect fluorescence light emitted by the fluorophore and generate signals indicative of a spectrum of energies of virtual states of the sample.

Aspect 10. The system of any of aspects 1 to 9, wherein the photodetector is to provide the signals indicative of the spectrum of energies of virtual states for the sample to a processor, and the processor is to execute machine readable instructions that, when executed, cause the processor to:
- collect, from the detector, the signals indicative of the spectrum of energies of virtual states;
- generate a spectral profile for the sample, the spectral profile comprising one or more spectral components corresponding to one or more virtual states of the sample; and
- storing the spectral profile.

Aspect 11. The system of any of aspects 1 to 10, wherein the detector is to provide the signal indicative of the fluorescent light to a processor, and the processor is to execute machine readable instructions that, when executed, cause the processor to:
- collect, from the detector, the signal indicative of the fluorescent light; and
- generate an image comprising a plurality pixels, each pixel being indicative of a received signal from the detector, and each pixel having a corresponding location in the transverse plane of the sample.

Aspect 12. A method for performing fluorescence microscopy, the method comprising:
- providing, by an entangled photon source, an entangled photon pair to a temporal delay line, wherein the entangled photon pair includes a signal photon and an idler photon;
- providing, by the temporal delay line, a delay to the entangled photon pair to create a relative temporal delay between the signal photon and the idler photon;
- providing the entangled photon pair to a sample, wherein the sample absorbs the entangled photon pair and emits fluorescence;
- detecting, by a detector, the fluorescence; and
- generating, by the detector, a signal indicative of the detected fluorescence.

Aspect 13. The method of aspect 12, wherein the temporal delay line comprises a birefringent delay line.

Aspect 14. The method of any of aspects 12 to 13, wherein the entangled photon source comprises a nonlinear optical medium configured to generate spontaneous parametric downconversion entangled photon pairs.

Aspect 15. The method of any of aspects 12 to 14, wherein the entangled photon pair comprises near-infrared photons.

Aspect 16. The method of any of aspects 12 to 15, wherein the temporal delay line provides a temporal delay having a temporal resolution of less than 1 femtosecond.

Aspect 17. The method of any of aspects 12 to 16, further comprising scanning, by a scanner, the entangled photon pair to provide the entangled photon pair to different regions of the sample in a transverse plane of the sample.

Aspect 18. The method of any of aspects 12 to 17, wherein the detector is configured to provide the signal indicative of the fluorescent light to a processor, and the method further comprises:
- collecting, by the processor, the signal indicative of the fluorescent light from the detector; and
- generating, by the processor, an image comprising a plurality pixels, each pixel being indicative of a received signal from the detector, and each pixel having a corresponding location in the transverse plane of the sample.

Aspect 19. The method of any of aspects 12 to 18, further comprising:
- generating, by the processor, a plurality of images, each image comprising a plurality of pixels with each pixel being indicative of a received signal from the detector; and
- generating, by the processor, a differential image from at least two images of the plurality of images.

Aspect 20. The method of any of aspects 12 to 19, further comprising, before generating the differential image, normalizing, by the processor, two or more images of the plurality of images to a background of each of the two or more images.

Aspect 21. A method for generating a spectral fingerprint of a sample, the method comprising:
- generating an entangled photon pair;
- providing the entangled photon pair to a temporal delay line, wherein the entangled photon pair includes a signal photon and an idler photon;
- providing, by the temporal delay line, a delay to the entangled photon pair to create a relative temporal delay between the signal photon and the idler photon;
- providing the entangled photon pair to a fluorophore to excite the fluorophore via an excitation pathway having a virtual state of the fluorophore;
- detecting fluorescence of the fluorophore;
- generating a spectral fingerprint of the fluorophore, the spectral fingerprint including one or more spectral components indicative of one or more virtual states of the fluorophore.

Aspect 22. A method according to aspect 21, wherein the entangled photon pair is generated via spontaneous parametric downconversion.

Aspect 23. A method according to either aspect 21 or aspect 22, wherein the temporal delay line comprises a birefringent delay line.

Aspect 24. A method according to any of aspects 21 to 23, wherein the entangled photon pair comprises near-infrared photons.

Aspect 25. A method according to any of aspects 21 to 24, wherein the temporal delay line provides a temporal delay having a resolution of less than 1 femtosecond.

Aspect 26. A method according to any of aspects 21 to 25, wherein the temporal delay line provides a temporal delay of between 0 and 5 picoseconds.

Aspect 27. A method according to any of aspects 21 to 26, further comprising:
- controlling the temporal delay of a plurality of entangled photon pairs, each pair of the plurality of entangled photon pairs having a different temporal delay;
- providing each pair of entangled photons of the plurality of entangled photon pairs to the fluorophore to excite the fluorophore;
- detecting fluorescence of the fluorophore due to the excitation of the fluorophore;
- generating signals indicative of the detected fluorescence; and
- determining the spectral fingerprint of the fluorophore, the spectral fingerprint including spectral components indicative of one or more virtual states of the fluorophore.

Aspect 28. A method according to any of aspects 21 to 27, further comprising: storing the spectral profile in a memory.

Aspect 29. A method for probing a fluorophore, the method comprising:
- obtaining a spectral fingerprint of the fluorophore, the spectral fingerprint including one or more spectral components indicative of one or more virtual states of the fluorophore;
- generating an entangled photon pair according to an energy of a virtual state of the fluorophore, the energy determined from a spectral component of the fingerprint;
- providing the generated entangled photon pair to the fluorophore to excite the fluorophore via two-photon absorption; and
- detecting fluorescence of the fluorophore.

Aspect 30. The method of aspect 29, further comprising, generating an image of the fluorophore from the detected fluorescence.

Aspect 31. The method of any of aspects 29 and 30 further comprising, determining a spectral component of the fluorophore from the detected fluorescence.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the target matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding; and no unnecessary limitations should be understood therefrom, as modifications within the scope of the invention may be apparent to those having ordinary skill in the art.

What is claimed:

1. A fluorescence probing system comprising:
an entangled photon source to generate an entangled photon pair including an idler photon and a signal photon;
a temporal delay line disposed to create a temporal delay between the idler photon and the signal photon to generate a temporally delayed entangled photon pair;
a coupling stage positioned to probe a sample having a fluorophore with the temporal delayed entangled photon pair to excite a virtual state of the fluorophore;
an objective configured to provide the delayed entangled photon pair to the fluorophore, and further configured to collect fluorescence from the fluorophore; and
a photodetector to detect fluorescent light emitted by the fluorophore and generate a signal indicative of the detected fluorescent light.

2. The system of claim 1, wherein the temporal delay line comprises a birefringent delay line.

3. The system of claim 1, wherein the entangled photon source comprises a nonlinear optical medium and is to generate the entangled photon pair by spontaneous parametric downconversion.

4. The system of claim 1, wherein the entangled photon source is to generate the entangled photon pair comprising near-infrared photons.

5. The system of claim 1, wherein the temporal delay line is to provide a temporal delay of between 0 seconds and 5 picoseconds.

6. The system of claim 1, wherein the temporal delay line is to provide a temporal delay having a temporal resolution of less than 1 femtosecond.

7. The system of claim 1, wherein the photodetector comprises a photomultiplier tube.

8. The system of claim 1, further comprising a scanner configured to scan the entangled photon pair in a transverse plane across the sample.

9. The system of claim 1, further comprising a controller to adjust the temporal delay between the idler photon and the signal photon over a sampling time to generate a plurality of different temporally delayed entangled photon pairs over the sampling time, each of the plurality having a different temporal delay; and wherein the photodetector is to detect fluorescence light emitted by the fluorophore and generate signals indicative of a spectrum of energies of virtual states of the sample.

10. The system of claim 9, wherein the photodetector is to provide the signals indicative of the spectrum of energies of virtual states for the sample to a processor, and the processor is to execute machine readable instructions that, when executed, cause the processor to:
collect, from the photodetector, the signals indicative of the spectrum of energies of virtual states;
generate a spectral profile for the sample, the spectral profile comprising one or more spectral components corresponding to one or more virtual states of the sample; and
storing the spectral profile.

11. The system of claim 1, wherein the photodetector is to provide the signal indicative of the fluorescent light to a processor, and the processor is to execute machine readable instructions that, when executed, cause the processor to:
collect, from the photodetector, the signal indicative of the fluorescent light; and
generate an image comprising a plurality pixels, each pixel being indicative of a received signal from the photodetector, and each pixel having a corresponding location in the transverse plane of the sample.

12. A method for performing fluorescence microscopy, the method comprising:
providing, by an entangled photon source, an entangled photon pair to a temporal delay line, wherein the entangled photon pair includes a signal photon and an idler photon;
providing, by the temporal delay line, a delay to the entangled photon pair to create a relative temporal delay between the signal photon and the idler photon;
providing, via an objective, the entangled photon pair to a sample, wherein the sample absorbs the entangled photon pair and emits fluorescence;
collecting, via the objective, the emitted fluorescence from the sample and providing the fluorescence to a detector;
detecting, by the detector, the fluorescence; and
generating, by the detector, a signal indicative of the detected fluorescence.

13. The method of claim 12, wherein the temporal delay line comprises a birefringent delay line.

14. The method of claim 12, wherein the entangled photon source comprises a nonlinear optical medium configured to generate spontaneous parametric downconversion entangled photon pairs.

15. The method of claim 12, wherein the entangled photon pair comprises near-infrared photons.

16. The method of claim 12, wherein the temporal delay line provides a temporal delay having a temporal resolution of less than 1 femtosecond.

17. The method of claim 12, further comprising scanning, by a scanner, the entangled photon pair to provide the entangled photon pair to different regions of the sample in a transverse plane of the sample.

18. The method of claim 12, wherein the detector is configured to provide the signal indicative of the fluorescent light to a processor, and the method further comprises:

collecting, by the processor, the signal indicative of the fluorescent light from the detector; and generating, by the processor, an image comprising a plurality pixels, each pixel being indicative of a received signal from the detector, and each pixel having a corresponding location in the transverse plane of the sample.

19. The method of claim 18, further comprising:

generating, by the processor, a plurality of images, each image comprising a plurality of pixels with each pixel being indicative of a received signal from the detector; and generating, by the processor, a differential image from at least two images of the plurality of images.

20. The method of claim 19, further comprising, before generating the differential image, normalizing, by the processor, two or more images of the plurality of images to a background of each of the two or more images.

* * * * *